(12) United States Patent
Choi et al.

(10) Patent No.: US 12,271,224 B2
(45) Date of Patent: Apr. 8, 2025

(54) MULTI DISPLAY STRUCTURE AND ELECTRONIC DEVICE WITH THE SAME

(71) Applicant: Samsung Electronics Co., Ltd., Suwon-si (KR)

(72) Inventors: Jongmun Choi, Suwon-si (KR); Younggoo Kang, Suwon-si (KR); Minhyouk Kim, Suwon-si (KR); Juree Kim, Suwon-si (KR); Junseok Kim, Suwon-si (KR); Sungmin Shin, Suwon-si (KR); Jongcheol Jang, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 18/168,845

(22) Filed: Feb. 14, 2023

(65) Prior Publication Data

US 2023/0259160 A1 Aug. 17, 2023

Related U.S. Application Data

(63) Continuation of application No. PCT/KR2023/002070, filed on Feb. 13, 2023.

(30) Foreign Application Priority Data

Feb. 14, 2022 (KR) .................. 10-2022-0019010
Mar. 3, 2022 (KR) .................. 10-2022-0027727

(51) Int. Cl.
*G06F 1/16* (2006.01)
*G02B 27/00* (2006.01)

(52) U.S. Cl.
CPC ....... *G06F 1/1616* (2013.01); *G02B 27/0025* (2013.01); *G06F 1/1647* (2013.01)

(58) Field of Classification Search
CPC . G02B 27/0025; G06F 1/1616; G06F 1/1641; G06F 1/1652; G06F 1/1681
See application file for complete search history.

(56) References Cited

U.S. PATENT DOCUMENTS 5,610,771 A * 3/1997 Sigler .................. G02B 26/002
359/554
D828,318 S * 9/2018 Seo ......................... D14/138 AD
(Continued)

FOREIGN PATENT DOCUMENTS

| CN | 110806655 A | 2/2020 |
| CN | 113658518 A | 11/2021 |

(Continued)

OTHER PUBLICATIONS

International Search Report and Written Opinion dated May 10, 2023, issued in International Patent Application No. PCT/KR2023/002070.

*Primary Examiner* — Adrian S Wilson
(74) *Attorney, Agent, or Firm* — Jefferson IP Law, LLP

(57) ABSTRACT

An electronic device is provided. The electronic device includes a first housing, a second housing rotatable with respect to the first housing, a hinge structure connecting the first housing to the second housing, a first glass member disposed in the first housing and including a first outer surface part and a first inner surface part including a first curved portion, a second glass member disposed in the second housing and including a second outer surface part and a second inner surface part including a second curved portion, a first display disposed between the first housing and the first glass member, a second display disposed between the second housing and the second glass member, and a light dispersion pattern layer including a portion disposed on the (1-2)th portion or the (2-2)th portion.

20 Claims, 14 Drawing Sheets

(56) References Cited

U.S. PATENT DOCUMENTS

| | | | |
|---|---|---|---|
| D842,833 S * | 3/2019 | Seo | D14/345 |
| 11,003,222 B2 * | 5/2021 | Moon | G06F 1/1647 |
| 11,029,522 B2 * | 6/2021 | Sheraj | G06F 1/1616 |
| 11,133,574 B2 * | 9/2021 | Mizunuma | H01Q 25/00 |
| 11,272,045 B2 * | 3/2022 | Ibrahim | G06F 1/1677 |
| D976,900 S * | 1/2023 | Escolin | D14/345 |
| D980,838 S * | 3/2023 | Escolin | D14/345 |
| 2008/0079656 A1 | 4/2008 | Kee et al. | |
| 2008/0253073 A1 | 10/2008 | Kee et al. | |
| 2010/0277443 A1 * | 11/2010 | Yamazaki | G02F 1/133305 |
| | | | 345/100 |
| 2012/0113614 A1 | 5/2012 | Watanabe | |
| 2015/0160698 A1 | 6/2015 | Tsukamoto et al. | |
| 2015/0255023 A1 | 9/2015 | Lee et al. | |
| 2018/0113241 A1 | 4/2018 | Powell et al. | |

FOREIGN PATENT DOCUMENTS

| | | |
|---|---|---|
| JP | 2001-092389 A | 4/2001 |
| KR | 10-2008-0030261 A | 4/2008 |
| KR | 10-2008-0093340 A | 10/2008 |
| KR | 10-2015-0105132 A | 9/2015 |
| KR | 10-1586795 B1 | 1/2016 |

* cited by examiner

MULTI DISPLAY STRUCTURE AND ELECTRONIC DEVICE WITH THE SAME

CROSS-REFERENCE TO RELATED APPLICATION(S)

This application is a continuation application, claiming priority under § 365(c), of an International application No. PCT/KR2023/002070, filed on Feb. 13, 2023, which is based on and claims the benefit of a Korean patent application number 10-2022-0019010, filed on Feb. 14, 2022, in the Korean Intellectual Property Office, and of a Korean patent application number 10-2022-0027727, filed on Mar. 3, 2022, in the Korean Intellectual Property Office the disclosure of each of which is incorporated by reference herein in its entirety.

TECHNICAL FIELD

The disclosure relates to an electronic device. More particularly, the disclosure relates to a multi-display structure and an electronic device including the same.

BACKGROUND ART

In line with remarkable development of information/communication technologies, semiconductor technologies, and the like, there has been widespread use of various kinds of electronic devices. Particularly, recent electronic devices have been developed to be carried and used for communication.

Electronic devices may refer to devices configured to perform specific functions according to installed programs, such as home appliances, electronic wallets, portable multimedia players, mobile communication terminals, tablet personal computers (PCs), video/audio devices, desktop/laptop computers, and vehicle navigation systems. For example, electronic devices may output stored information as sounds or images. In line with the high degree of integration of electronic devices and the widespread use of super-fast large-capacity wireless communication, it has recently become possible to equip a single electronic device (for example, mobile communication terminal) with various functions. For example, not only a communication function, but also an entertainment function (for example, gaming), a multimedia function (for example, music/video playback), communication and security functions for mobile banking, a scheduling function, and an electronic wallet function may be integrated into a single electronic device. Such electronic devices have become compact such that users can conveniently carry the same.

Mobile communication services have been extended to multimedia service areas, and electronic device may have increased display sized such that users can sufficiently use multimedia services, in addition to voice communication or short messaging services.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

An electronic device (for example, portable terminal, tablet PC, or laptop computer) may include a display having a flat surface or having a flat surface and a curved surface. An electronic device including a display may have a limitation on implementing a screen larger than the size of the electronic device, due to the fixed display structure. Therefore, there has been study regarding electronic devices including multi-displays.

An electronic device including a multi-display may include a dual display or multiple displays (three or more). An electronic device including a multi-display may have an excessive degree of luminance or a light leakage phenomenon resulting from superimposition of paths of light emitted from respectively displays at the boundary between adjacent displays, thereby posing a concern that images may appear visually discontinuous at the boundary between of the multi-display.

Aspects of the disclosure are to address at least the above-mentioned problems and/or disadvantages and to provide at least the advantages described below. Accordingly, an aspect of the disclosure is to provide a multi-display structure configured such that images can appear visually continuous at the boundary of the multi-display, and an electronic device including the same.

Problems to be solved by the disclosure are not limited to the above-mentioned problems, and may be variously extended without deviating from the idea and scope of the disclosure.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a first housing and a second housing configured to provide relative movement with respect to the first housing, a hinge structure configured to connect the first housing and the second housing and allow the first housing and the second housing to rotate between a folded state and an unfolded state, a first glass member disposed in the first housing and including a first outer surface part including a (1-1)th portion and a (1-2)th portion disposed to be substantially perpendicular to the (1-1)th portion and a first inner surface part including a first curved portion, a second glass member disposed in the second housing and including a second outer surface part including a (2-1)th portion and a (2-2)th portion disposed to be substantially perpendicular to the (2-1)th portion and a second inner surface part including a second curved portion, a first display disposed between the first housing and the first glass member and including a third curved portion having a curvature corresponding to that of the first curved portion, a second display disposed between the second housing and the second glass member and including a fourth curved portion having a curvature corresponding to that of the second curved portion, and a light dispersion pattern layer comprising at least a portion disposed on at least one among the (1-2)th portion or the (2-2)th portion.

In accordance with another aspect of the disclosure, an electronic device is provided. The electronic device includes a housing including a first housing and a second housing configured to provide relative movement with respect to the first housing, a hinge structure configured to connect the first housing and the second housing and allow the first housing and the second housing to rotate between a folded state and an unfolded state, a first glass member disposed in the first housing and including a first outer surface part including a (1-1)th portion and a (1-2)th portion disposed to be substantially perpendicular to the (1-1)th portion and a first inner surface part including a first curved portion, a second glass member disposed in the second housing and including a second outer surface part including a (2-1)th portion and a (2-2)th portion disposed to be substantially perpendicular to the (2-1)th portion and a second inner surface part including a second curved portion, a first display disposed between the first housing and the first glass member and including a third curved portion having a curvature corresponding to that of the first curved portion, a second display disposed between the second housing and the second glass member and including a fourth curved portion having a curvature corresponding to that of the second curved portion, a first light dispersion pattern layer comprising at least a portion disposed on at least a portion of the (1-2)th portion, and a second light dispersion pattern layer comprising at least a portion disposed on at least a portion of the (2-2)th portion.

In accordance with another aspect of the disclosure, a display structure is provided. The display structure includes a first glass member including a first outer surface part including a (1-1)th portion and a (1-2)th portion disposed to be substantially perpendicular to the (1-1)th portion and a first inner surface part including a first curved portion, a second glass member including a second outer surface part including a (2-1)th portion and a (2-2)th portion disposed to be substantially perpendicular to the (2-1)th portion and a second inner surface part including a second curved portion, a first display disposed on the first glass member and including a third curved portion having a curvature corresponding to that of the first curved portion, a second display disposed on the second glass member and including a fourth curved portion having a curvature corresponding to that of the second curved portion, and a light dispersion pattern layer comprising at least a portion disposed on at least one among at least a portion of the (1-2)th portion or at least a portion of the (2-2)th portion.

Advantageous Effects

According to various embodiments of the disclosure, a luminance reduction structure and/or a light leakage reduction structure may provide visually continuous images at the boundary of a multi-display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
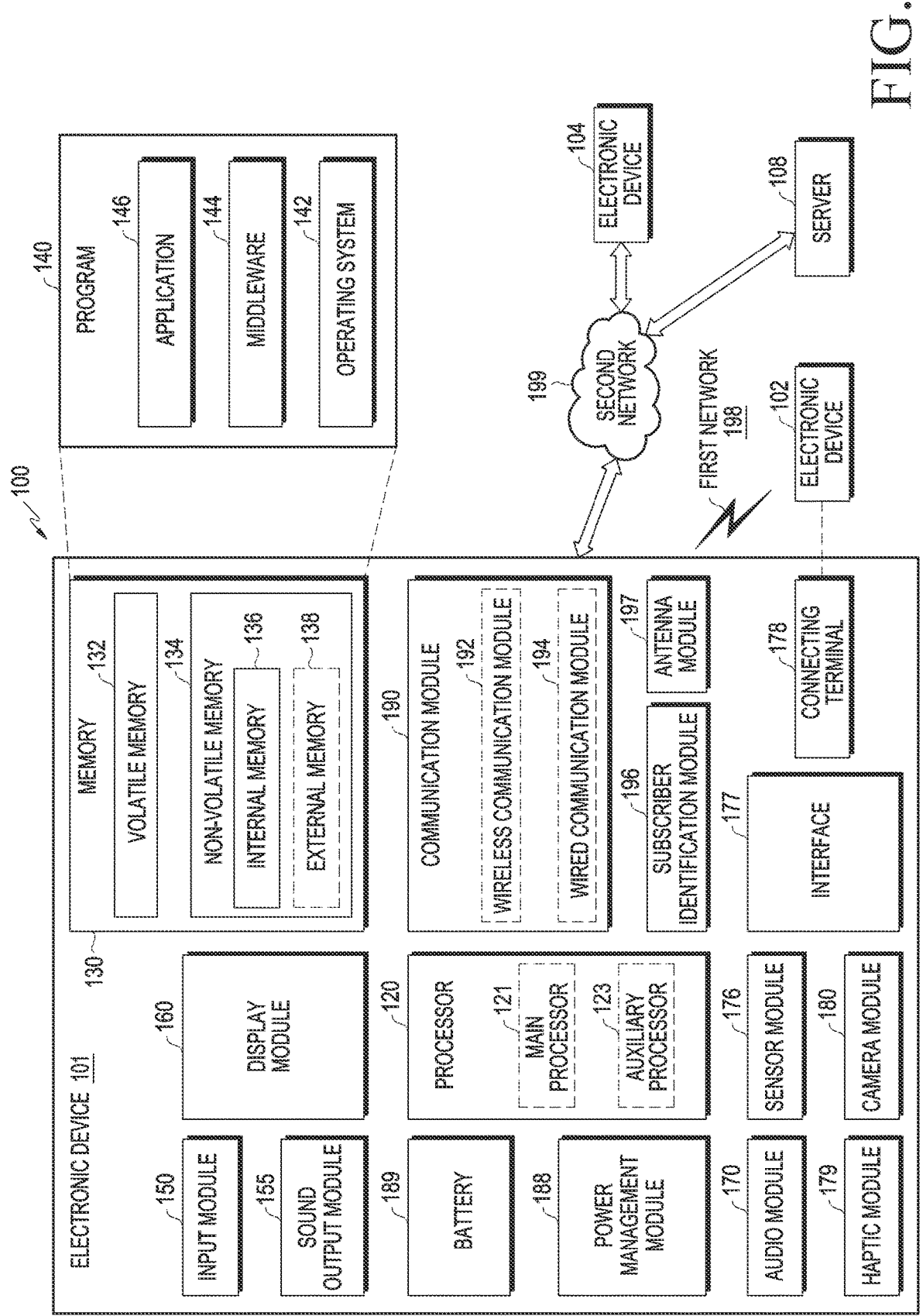
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it delineates that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply delineates that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
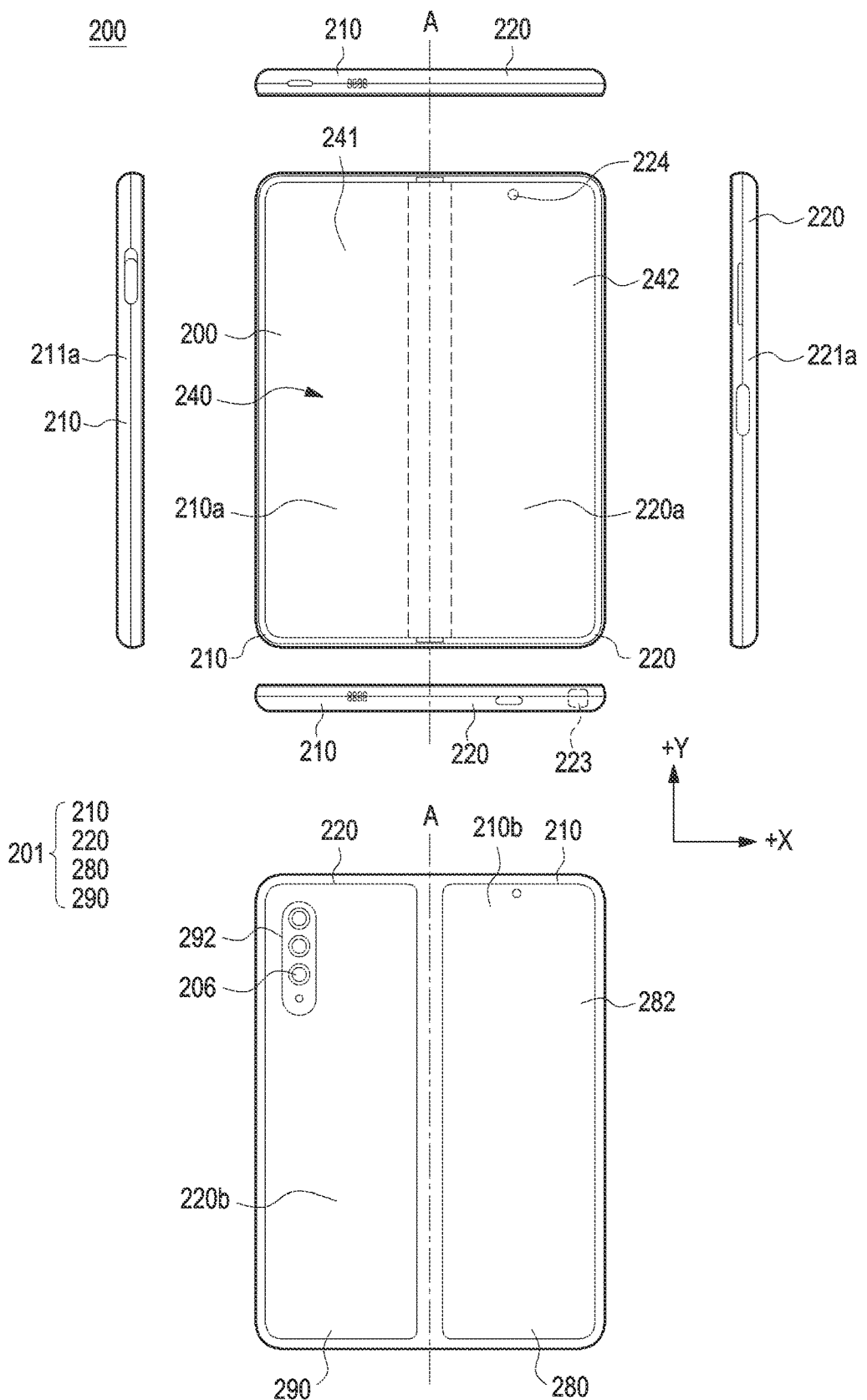
FIG. 2 is a view illustrating an unfolded state of an electronic device according to an embodiment of the disclosure.

FIG. 2 is a view illustrating an unfolded state of an electronic device according to an embodiment of the disclosure.

Figure 3:
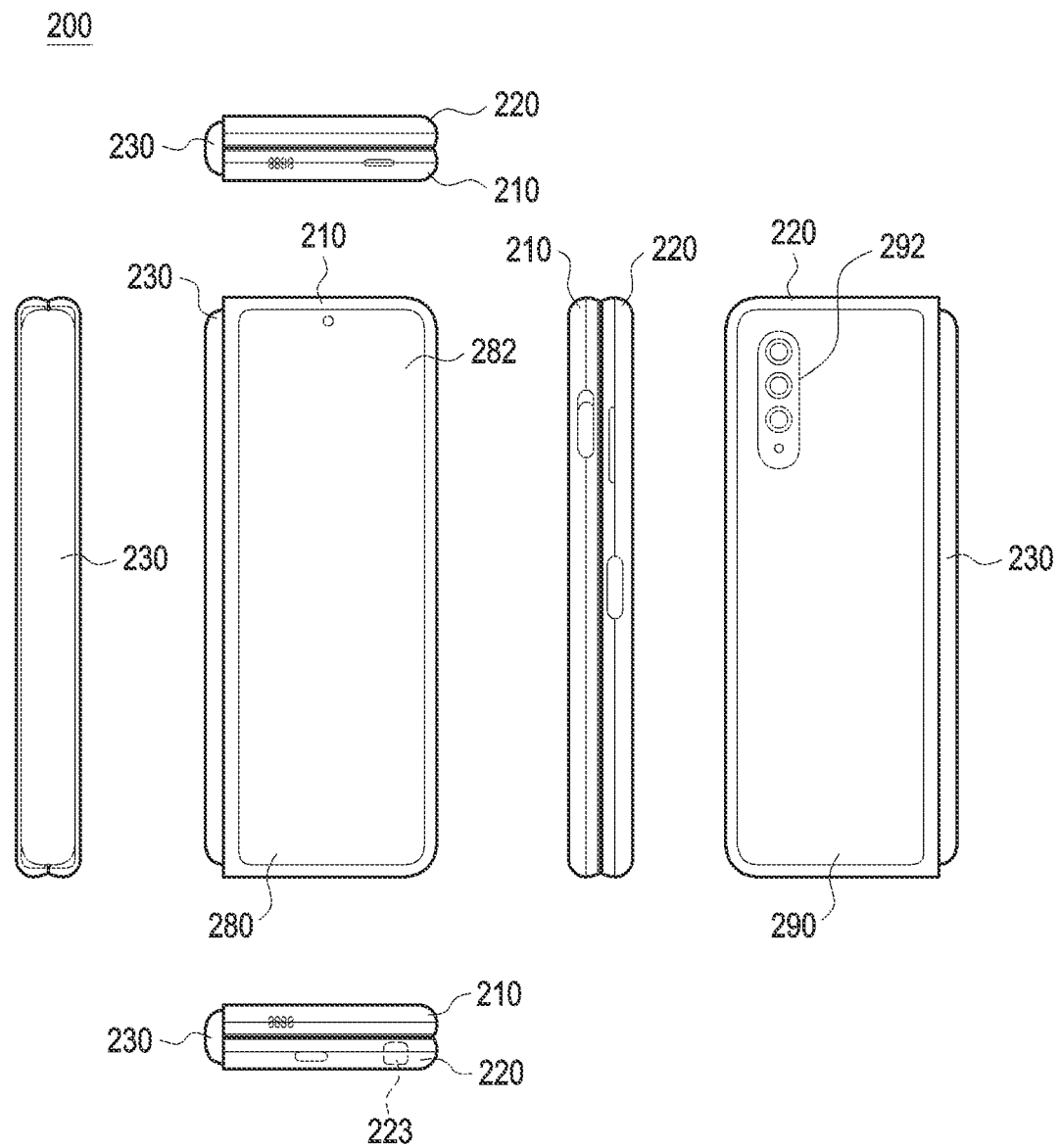
FIG. 3 is a view illustrating a folded state of an electronic device according to an embodiment of the disclosure.

FIG. 3 is a view illustrating a folded state of an electronic device according to an embodiment of the disclosure.

Referring to FIGS. 2 and 3, in an embodiment, an electronic device 200 may include housings 201, a hinge cover 230 configured to cover foldable portions of the housings 201, and a first display 241 and a second display 242 arranged in a space configured by the housings 201. According to an embodiment, a surface on which the first display 241 and the second display 242 are arranged is defined as a front surface (e.g., a first front surface 210a and a second front surface 220a). And, an opposite surface of the front surface is defined as a rear surface (e.g., a first rear surface 210b and a second rear surface 220b) of the electronic device 200. In addition, a surface surrounding a space between the front surface and the rear surface is defined as a side surface (e.g., a first side surface 211a and a second side surface 221a) of the electronic device 200.

According to various embodiments, the housings 201 may include a first housing 210, a second housing 220 which is rotatable with respect to the first housing 210, a first rear surface cover 280, and a second rear surface cover 290. The housings 201 of the electronic device 200 are not limited to a shape and a coupling illustrated in FIGS. 2 and 3, and may be implemented by a combination and/or coupling of other shapes or components. For example, in another embodiment, the first housing 210 and the first rear surface cover 280 may be integrally configured, and the second housing 220 and the second rear surface cover 290 may be integrally configured. According to various embodiments, the first housing 210 may be connected to a hinge module (e.g., a hinge module 202 of FIG. 4), and include the first front surface 210a oriented to a first direction and the first rear surface 210b oriented to a second direction opposite to the first direction. The second housing 220 may be connected to the hinge module (e.g., a hinge module 202 of FIG. 4), include the second front surface 220a oriented to a third direction and the second rear surface 220b oriented to a fourth direction opposite to the third direction, and rotate with respect to the first housing 210 around the hinge module 202. Accordingly, the electronic device 200 may vary into a folded state or an unfolded state. In the electronic device 200, the first front surface 210a may face the second front surface 220a in a folded state, and the third direction may be the same as the first direction in an unfolded state. In the following description, unless otherwise described, descriptions will be made based on a folded state of the electronic device 200.

According to various embodiment, the first housing 210 and the second housing 220 may be arranged on opposite sides around a folding axis A, and have an overall symmetrical shape with respect to the folding axis A. As will be described later, an angle or a distance between the first housing 210 and the second housing 220 may vary depending on whether the state of the electronic device 200 is an unfolded state, a folded state, or an intermediate state. According to an embodiment, unlike the first housing 210, the second housing 220 may additionally include a sensor area 224 in which various sensors (e.g., a front surface camera) are arranged, but have a symmetrical shape in the other area except the sensor area. According to an embodiment, the folding axis A may be multiple (e.g., two) folding axes parallel to each other. In the disclosure, the folding axis A is provided along the lengthwise direction (Y axis direction) of the electronic device 200, but the direction of the folding axis A is not limited thereto. For example (not shown), the electronic device 200 may include a folding axis A extending along the widthwise direction (e.g., X axis direction).

According to an embodiment, the electronic device 200 may include a structure into which a digital pen can be inserted. For example, a hole 223 into which the digital pen can be inserted may be disposed through a side surface of the first housing 210 or a side surface of the second housing 220 in the electronic device 200.

According to various embodiments, at least a portion of the first housing 210 and the second housing 220 may be made of a non-metal material or a metal material having a rigidity selected to support a display 240. The at least a portion made of a metal material may provide a ground plane of the electronic device 200, and be electrically connected to a ground line disposed on a printed circuit board (e.g., a substrate unit 260 of FIG. 4).

According to various embodiments, the sensor area 224 may be disposed to be adjacent to a corner of the second housing 220 and have a predetermined area. The disposition, the shape, and the size of the sensor area 224 are not limited to the illustrated example. For example, in another embodiment, the sensor area 224 may be provided in another corner of the second housing 220 or in an arbitrary area between an upper end corner and a lower end corner, or in the first housing 210. In an embodiment, components configured to perform various functions embedded in the electronic device 200 may be exposed to the front side of the electronic device 200 through the sensor area 224 or through one or more openings provided through the sensor area 224. In various embodiments, the components may include various kinds of sensors. The sensors may include, for example, at least one among a front surface camera, a receiver, or a proximity sensor.

According to various embodiments, the first rear surface cover 280 may be disposed at one part of the folding axis A in the rear surface of the electronic device 200, have, for example, a substantially rectangular periphery, and the periphery may be surrounded by the first housing 210. Similarly, the second rear surface cover 290 may be disposed at the other part of the folding axis A in the rear surface of the electronic device 200 and the periphery of the second rear surface cover may be surrounded by the second housing 220.

According to various embodiments, the first rear surface cover 280 and the second rear surface cover 290 may have a substantially symmetrical shape around the folding axis (A axis). The first rear surface cover 280 and the second rear surface cover 290 may not necessarily have a substantially symmetrical shape, and in another embodiment, the electronic device 200 may include the first rear surface cover 280 and a second rear surface cover 290 which have various shapes.

According to various embodiments, the first rear cover 280, the second rear cover 290, the first housing 210, and the second housing 220 may configure a space in which various components (e.g., a printed circuit board or a battery) of the electronic device 200. According to an embodiment, one or more components may be arranged or visually exposed on the rear surface of the electronic device 200. For example, at least a portion of a sub-display (e.g., a sub-display 244 of FIG. 4) may be visually exposed through a first rear surface area 282 of the first rear surface cover 280. In another embodiment, one of more components or sensors may be visually exposed through a second rear surface area 292 of the second rear surface cover 290. In various embodiments, the sensors may include a proximity sensor and/or a camera module 206 (e.g., a rear surface camera).

According to various embodiments, the front surface camera exposed on the front surface of the electronic device 200 through one or more openings provided through the sensor area 224 or the camera module 206 exposed through the second rear surface area 292 of the second rear surface cover 290 may include one or more lenses, image sensors, and/or image signal processes. In an embodiment, two or more lenses (an infrared camera, a wide-angle lens, and a telescopic lens) and image sensors may be arranged on one surface of the electronic device 200.

Figure 4:
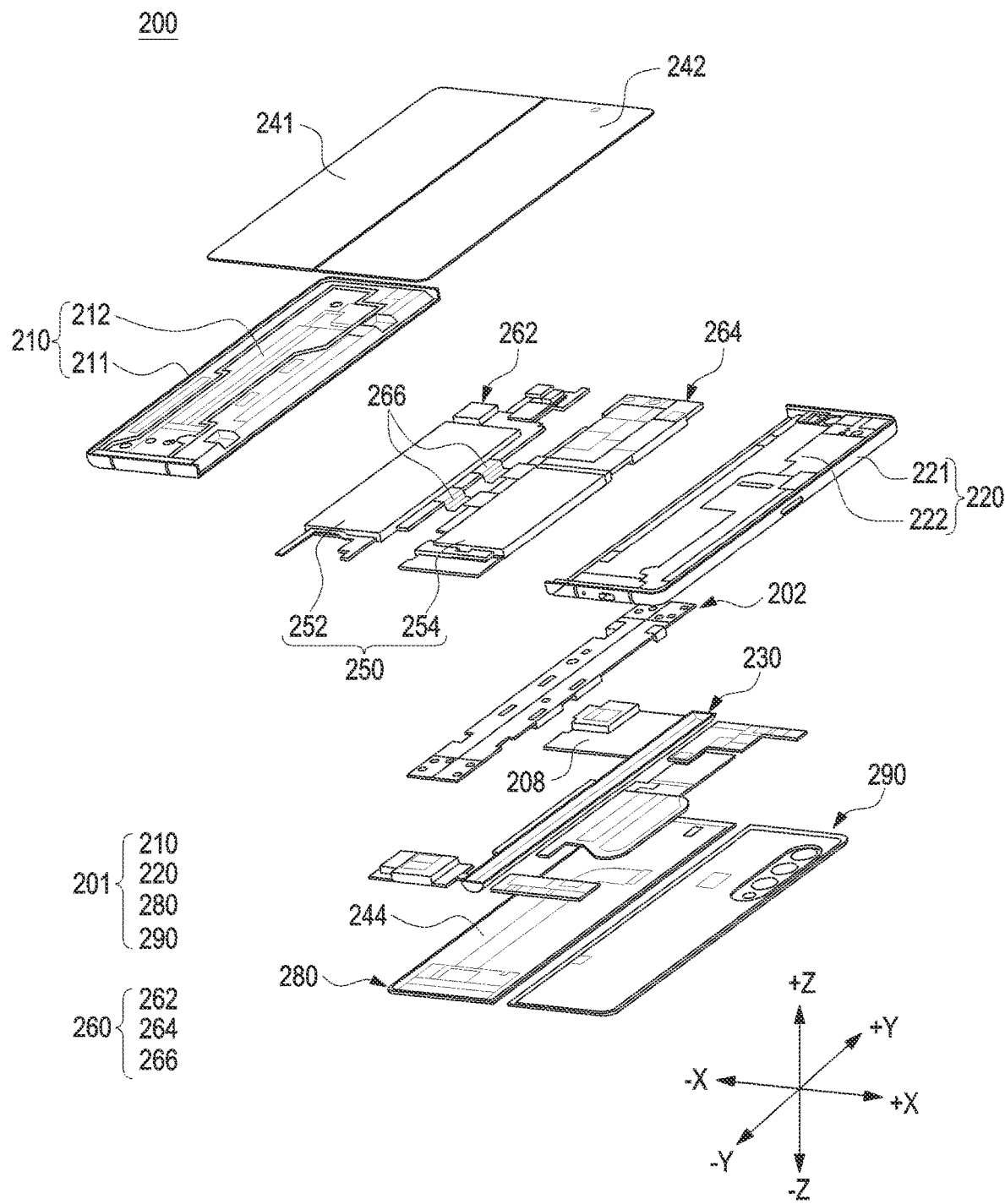
FIG. 4 is an exploded perspective view of an electronic device according to an embodiment of the disclosure.

Referring to FIG. 3, the hinge cover 230 may be disposed between the first housing 210 and the second housing 220 to cover an internal component (e.g., a hinge module 202 of FIG. 4). According to an embodiment, the hinge cover 230 may be covered by a part of the first housing 210 and the second housing 220 or be exposed to the outside, according to a state (an unfolded state (flat state) or a folded state) of the electronic device 200.

According to an embodiment, as illustrated in FIG. 2, when the electronic device 200 is in an unfolded state, the hinge cover 230 may be covered by the first housing 210 and the second housing 220 and may not be exposed. For another example, as illustrated in FIG. 3, when the electronic device 200 is in a folded state (e.g., a fully folded state), the hinge cover 230 may be exposed to the outside between the first housing 210 and the second housing 220. For still another example, in an intermediate state in which the first housing 210 and the second housing 220 make a predetermined angle (folded with a certain angle) with respect to each other, the hinge cover 230 may be partly exposed to the outside between the first housing 210 and the second housing 220. The exposed area in an intermediate state may be smaller than that in a fully folded state. In an embodiment, the hinge cover 230 may include a curved surface.

According to various embodiments, the display 240 may be disposed over the space configured by the housings 201. For example, the display 240 may be stably seated on a recess configured by the housings 201, and be configured to be most of the front surface of the electronic device 200. Therefore, the front surface of the electronic device 200 may include the display 240 and a partial area of the first housing 210 and a partial area of the second housing 220 which are adjacent to the display 240. And, the rear surface of the electronic device 200 may include the first rear surface cover 280, a partial area of the first housing 210, which is adjacent to the first rear surface cover 280, the second rear surface cover 290, and a partial area of the second housing 220, which is adjacent to the second rear surface cover 290.

According to an embodiment, the first display 241 and the second display 242 may be spaced apart from each other. For example, the first display 241 may be disposed on the first housing 210, and the second display 242 may be disposed on the second housing 220.

According to an embodiment, the first display 241 and the second display 242 may be rigid displays which are spaced apart from each other or flexible displays at least a portion of each of which includes a curved portion. For example, the first display 241 and the second display 242 may be understood to be dual displays or multiple displays. According to an embodiment, the first display 241 and the second display 242 may rotate with respect to the folding axis A.

According to an embodiment, the first display 241 and the second display 242 may delineate a display having at least a partial area to be deformable into a flat surface or a curved surface. For example, the first display 241 and the second display 242 may be a foldable or flexible display. Division of the first display 241 and the second display 242 is exemplary, and the display may be divided into a plurality of displays (e.g., four or more, or two) according to the structure or the function thereof. For example, in an embodiment illustrated in FIG. 2, the area of the display 240 may be divided by the folding axis (A axis) extending to be parallel to Y axis, but in another embodiment, the area of the display 240 may be divided with respect to another folding axis (e.g., a folding axis parallel to X axis). According to an embodiment, the first display 241 and the second display 242 may be arranged to be coupled or adjacent to a touch detection circuit, a pressure sensor capable of measuring the strength (pressure) of a touch, and/or a digitizer (not shown) configured to detect a magnetic stylus pen.

According to various embodiments, the first display 241 and the second display 242 may have an overall symmetrical shape around the folding axis A. According to an embodiment (not shown), the second display 242, unlike the first display 241, may include a notch cut depending on the existence of the sensor area 224, but in the other area except the sensor area, may have a shape symmetrical to the first display 241. In other words, the first display 241 and the second display 242 may include a portion symmetrical to each other and a portion non-symmetrical to each other.

Hereinafter, operations of the first housing 210 and the second housing 220 according to the state (e.g., an unfolded state (or flat state) and a folded state) of the electronic device 200 will be described.

According to various embodiments, when the electronic device 200 is in an unfolded state (flat state) (e.g., FIG. 2), the first housing 210 and the second housing 220 may substantially make an angle of 180 degrees and be arranged to face the same direction. The surface of the first display 241 and the surface of the second display 242 of the display 240 may be configured to make 180 degrees and may face the same direction (e.g., the front surface direction of the electronic device).

According to various embodiments, when the electronic device 200 is in a folded state (e.g., FIG. 3), the first housing 210 and the second housing 220 may be arranged to face each other. The surface of the first display 241 and the surface of the second display 242 of the display 240 may be configured to make a narrow angle (e.g., between 0 degrees and 10 degrees) and may face each other.

According to various embodiments, when the electronic device 200 is in an intermediate state (not shown), the first housing 210 and the second housing 220 may be arranged to make a predetermined angle (a certain angle) with each other. The surface of the first display 241 and the surface of the second display 242 of the display 240 may be configured to make an angle which is greater than that in a folded state and smaller than that in an unfolded state.

FIG. 4 is an exploded perspective view of an electronic device according to an embodiment of the disclosure.

Referring to FIG. 4, an electronic device 200 may include housings 201, a first display 241, a second display 242, a hinge module 202, batteries 250, and a substrate unit 260.

According to various embodiments, the housings 201 may include a first housing 210, a second housing 220, a first rear surface cover 280, and a second rear surface cover 290. The configuration of the first housing 210, the second housing 220, a hinge cover 230, the first rear surface cover 280, and the second rear surface cover 290, in FIG. 4 may be wholly or partly the same as the first housing 210, the second housing 220, the hinge cover 230, the first rear surface cover 280, and the second rear surface cover 290, in FIG. 2 and/or FIG. 3.

According to various embodiments, the first housing 210 and the second housing 220 may be assembled with each other to be coupled to opposite sides of the hinge module 202. According to an embodiment, the first housing 210 may include a first support area 212 which can support a component (e.g., first circuit board 262 and/or first battery 252) of the electronic device 200 and a first side wall 211 which surrounds at least a portion of the first support area 212. The first side wall 211 may include a first side surface (e.g., first side surface 211a of FIG. 3) of the electronic device 200. According to an embodiment, the second housing 220 may include a second support area 222 which can support a component (e.g., second circuit board 264 and/or second battery 254) of the electronic device 200 and a second side wall 221 which surrounds at least a portion of the second support area 222. The second side wall 221 may include a second side surface (e.g., second side surface 221a of FIG. 3) of the electronic device 200.

According to various embodiments, the electronic device 200 may include a first display 241, a second display 242, and a sub-display 244. The configuration of the first display 241 and the second display 242 in FIG. 4 may be wholly or partly the same as the configuration of the first display 241 and the second display 242 in FIG. 2 and/or FIG. 3.

According to various embodiments, the sub-display 244 may display a screen in a direction different from those of the first display 241 and the second display 242. For example, the sub-display 244 may output a screen in a direction opposite to that of the first display 241. According to an embodiment, the sub-display 244 may be disposed on the first rear surface cover 280.

According to various embodiments, the batteries 250 may include a first battery 252 disposed in the first housing 210 and a second battery 254 disposed in the second housing 220. According to an embodiment, the first battery 252 may be disposed on the first circuit board 262 and the second battery 254 may be disposed on the second circuit board 264. According to an embodiment, the batteries 250 may supply power to at least one component of the electronic device 200. According to an embodiment, the batteries 250 may include, for example, a non-rechargeable primary battery, a rechargeable secondary battery, or a fuel cell.

According to various embodiments, the substrate unit 260 may include a first circuit board 262 disposed in the first housing 210 and a second circuit board 264 disposed in the second housing 220. According to an embodiment, the substrate unit 260 may include at least one flexible circuit board 266 configured to electrically connect the first circuit board 262 and the second circuit board 264. According to an embodiment, at least a portion of the flexible circuit board 266 may be disposed across the hinge module 202. According to an embodiment, the first circuit board 262 and the second circuit board 264 may be arranged in a space configured by the first housing 210, the second housing 220, the first rear surface cover 280, and the second rear surface cover 290. Components configured to implement various functions of the electronic device 200 may be arranged on the first circuit board 262 and the second circuit board 264.

According to various embodiments, the electronic device 200 may include a speaker module 208. According to an embodiment, the speaker module 208 may convert an electrical signal into sound. According to an embodiment, the speaker module 208 may be disposed in a space configured by the first housing 210, the second housing 220, the first rear surface cover 280, and the second rear surface cover 290. According to an embodiment, the speaker module 208 may convert an electrical signal into sound.

The detailed description below may include an example of a configuration in which a pair of housings (or, referred to as "housings") are rotatably coupled to and by a hinge module (or, referred to as a "hinge structure"). However, it should be noted that such an embodiment does not limit the electronic device according to various embodiments disclosed herein. For example, the electronic device according to various embodiments disclosed herein may include three or more housings, "a pair of housings" disclose in an embodiment below may mean "two housings, among the three or more housings, rotatably coupled with each other."

In addition, for the electronic device according to various embodiments disclosed herein, an electronic device of an in-folding type in which at least a portion of a first display and at least a portion of a second display are arranged to face each other in a state where the electronic device is in a folded state is described as an example. However, the electronic device according to various embodiments disclosed herein is not limited to this, the electronic device may be applied to an electronic device of an out-folding type in which at least a portion of a first display and at least a portion of a second display are arranged in directions opposite to each other in a state where the electronic device in a folded state.

Figure 5:
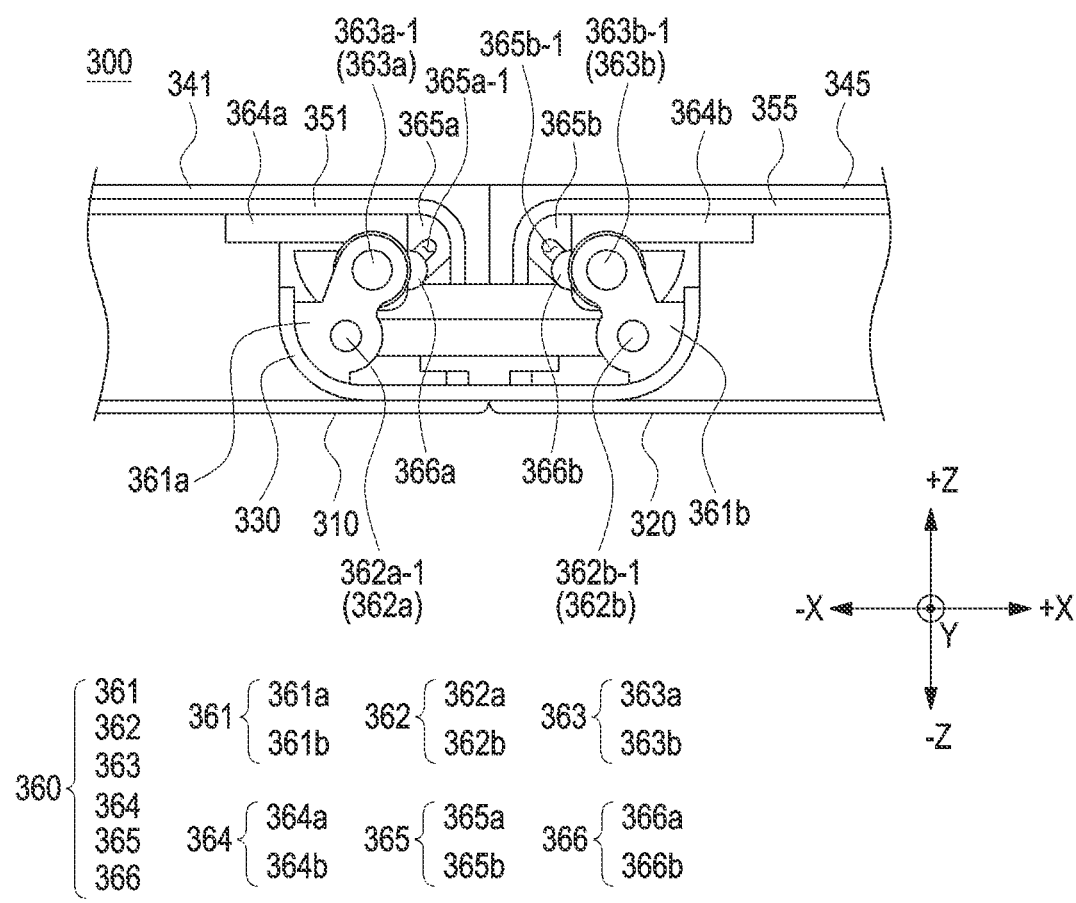
FIG. 5 is a cross-sectional view of an electronic device including multiple displays according to an embodiment of the disclosure.

FIG. 5 is a cross-sectional view of an electronic device including multiple displays according to an embodiment of the disclosure.

Referring to FIG. 5, an electronic device 300 (e.g., electronic device 101 of FIG. 1 or electronic device 200 of FIGS. 2 to 4) may include a first housing 310, a second housing 320, a first display 351, a second display 355, a hinge cover 330, a hinge module 360, a first glass member 341, and a second glass member 345.

The configuration of the first housing 310, the second housing 320, the first display 351, the second display 355, the hinge cover 330, and the hinge module 360 in FIG. 5 may be wholly or partly the same as the configuration of the first housing 210, the second housing 220, the first display 241, the second display 242, the hinge cover 230, and the hinge module 202 in FIG. 4.

According to various embodiments, the first glass member 341 may be disposed in the first housing 310. According to an embodiment, at least a portion of the first glass member 341 may configure a front surface (e.g., the first front surface 210a of FIG. 2) of the electronic device 300. According to an embodiment, the first glass member 341 may be defined and understood as a configuration separate from the first housing 310. According to another embodiment, the first glass member 341 may be defined and understood as a partial configuration of the first housing 310. According to an embodiment, at least a portion of the first glass member 341 may be configured by a substantially transparent plate (e.g., a polymer plate or a glass plate including various coating layers). According to an embodiment, the first glass member 341 may be configured to cover the first display 351.

According to various embodiments, the second glass member 345 may be disposed in the second housing 320. According to an embodiment, at least a portion of the second glass member 345 may configure a front surface (e.g., the second front surface 220a of FIG. 2) of the electronic device 300. According to an embodiment, the second glass member 345 may be defined and understood as a configuration separate from the second housing 320. According to another embodiment, the second glass member 345 may be defined and understood as a partial configuration of the second housing 320. According to an embodiment at least a portion of the second glass member 345 may be configured by a substantially transparent plate (e.g., a polymer plate or a glass plate including various coating layers). According to an embodiment, the second glass member 345 may be configured to cover the second display 355.

According to various embodiments, the first display 351 may be disposed between the first housing 310 and the first glass member 341. According to an embodiment, at least a portion of the first display 351 may be a curved portion.

According to various embodiments, the second display 355 may be disposed between the second housing 320 and the second glass member 345. According to an embodiment, at least a portion of the second display 355 may be a curved portion.

According to various embodiments, the hinge module 360 may include first support members 361, first gears 362, second gears 363, second support members 364, third support members 365, and first fixing members 366.

According to various embodiments, a pair of each of components 361 to 366 of the hinge module may be provided to correspond to the pair of housings 310 and 320 and/or the pair of displays 351 and 355.

According to various embodiments, at least a portion of the first support members 361 may be coupled to the hinge cover 330. The first support members 361 may include a (1-1)th support member 361a and a (1-2)th support member 361b spaced apart from the (1-1)th support member 361a. According to an embodiment, the (1-1)th support member 361a may rotatably support a rotation shaft 362a-1 of a (1-1)th gear 362a, and rotatably support a rotation shaft 363a-1 of a (2-1)th gear 363a. According to an embodiment, the (1-2)th support member 361b may rotatably support a rotation shaft 362b-1 of the (1-2)th gear 362b, and rotatably support a rotation shaft 363b-1 of the (2-2)th gear 363b.

According to various embodiments, rotation shafts of the first gears 362 may be rotatably coupled to the first support members 361. The first gears 362 may include the (1-1)th gear 362a coupled to the (1-1)th support member 361a and the (1-2)th gear 362b coupled to the (1-2)th support member 361b. According to an embodiment, the rotation shaft 362a-1 of the (1-1)th gear 362a may be rotatably coupled to the (1-1)th support member 361a, and be connected to be engaged with the (2-1)th gear 363a. According to an embodiment, the rotation shaft 362b-1 of the (1-2)th gear 362b may be rotatably coupled to the (1-2)th support member 361b, and be connected to be engaged with the (2-2)th gear 363b.

According to various embodiments, rotation shafts of the second gears 363 may be rotatably coupled to the first support members 361. The second gears 363 may include the (2-1)th gear 363a coupled to the to the (1-1)th support member 361a and the (2-2)th gear 363b coupled to the (1-2)th support member 361b. According to an embodiment, the rotation shaft 363a-1 of the (2-1)th gear 363a may be rotatably coupled to the (1-1)th support member 361a, and may be connected to be engaged with the (1-1)th gear 362a. In addition, a shaft (not shown) of the (2-1)th support member 364a may be coupled to at least a portion of the (2-1)th gear 363a. According to an embodiment, the rotation shaft 363b-1 of the (2-2)th gear 363b may be rotatably coupled to the (1-2)th support member 361b, and be connected to be engaged with the (1-2)th gear 362b. In addition, a shaft (not shown) of the (2-2)th support member 364b may be coupled to at least a portion of the (2-2)th gear 363b.

According to various embodiments, at least a portion of the second support members 364 may be configured to support flat surface portions of the first display 351 and the second display 355. The second support members 364 may include the (2-1)th support member 364a and the (2-2)th support member 364b. According to an embodiment, at least a portion of the (2-1)th support member 364a is configured to support a flat surface portion of the first display 351, and the shaft of the (2-1)th support member 364a may be coupled to at least a portion of the (2-1)th gear 363a. According to an embodiment, at least a portion of the (2-2)th support member 364b is configured to support a flat surface portion of the second display 355, and the shaft of the (2-2)th support member 364b may be coupled to at least a portion of the (2-2)th gear 363b.

According to various embodiments, at least a portion of the third support members 365 may be configured to support curved portions of the first display 351 and the second display 355. The third support member 365 may include a (3-1)th support member 365a and a (3-2)th support member 365b. According to an embodiment, at least a portion of the (3-1)th support member 365a may be configured to support a curved portion of the first display 351, and include a first slot 365a-1 disposed through at least a portion of the (3-1)th support member 365a. In addition, the first slot 365a-1 of the (3-1)th support member 365a may be slidably coupled to a (1-1)th fixing member 366a. According to an embodiment, at least a portion of the (3-2)th support member 365b may be configured to support a curved portion of the second display 355, and include a second slot 365b-1 disposed through at least a portion of the (3-2)th support member 365b. In addition, the second slot 365b-1 of the (3-2)th support member 365b may be slidably coupled to a (1-2)th fixing member 366b.

According to various embodiments, the third support members 365 may be slidably coupled to at least a portion of the first fixing members 366. According to an embodiment, the first fixing members 366 may be coupled to the hinge cover 330, the first support members 361, or other structures (not shown) fixed to the hinge cover 330, and the first fixing members 366 may be located in a position relatively fixed to the hinge cover 330. The first fixing members 366 may include the (1-1)th fixing member 366a and the (1-2)th fixing member 366b. According to an embodiment, the first slot 365a-1 of the (3-1)th support member 365a may be slidably coupled to at least a portion of the (1-1)th fixing member 366a. According to an embodiment, the second slot 365b-1 of the (3-2)th support member 365b may be slidably coupled to at least a portion of the (1-2)th fixing member 366b.

Figure 6A:
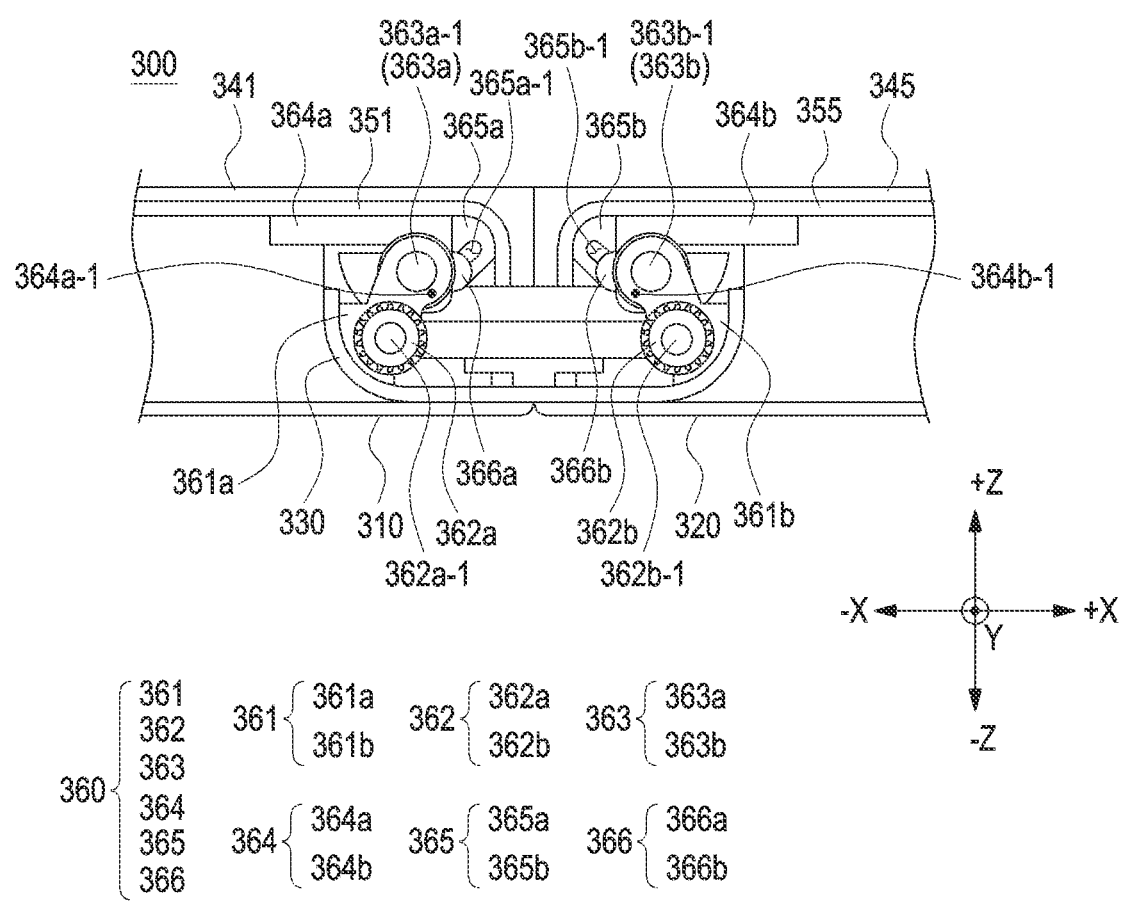
FIG. 6A is a cross-sectional view illustrating an unfolded state of an electronic device including multiple displays according to an embodiment of the disclosure.

FIG. 6A is a cross-sectional view illustrating an unfolded state of an electronic device including multiple displays according to an embodiment of the disclosure.

Figure 6B:
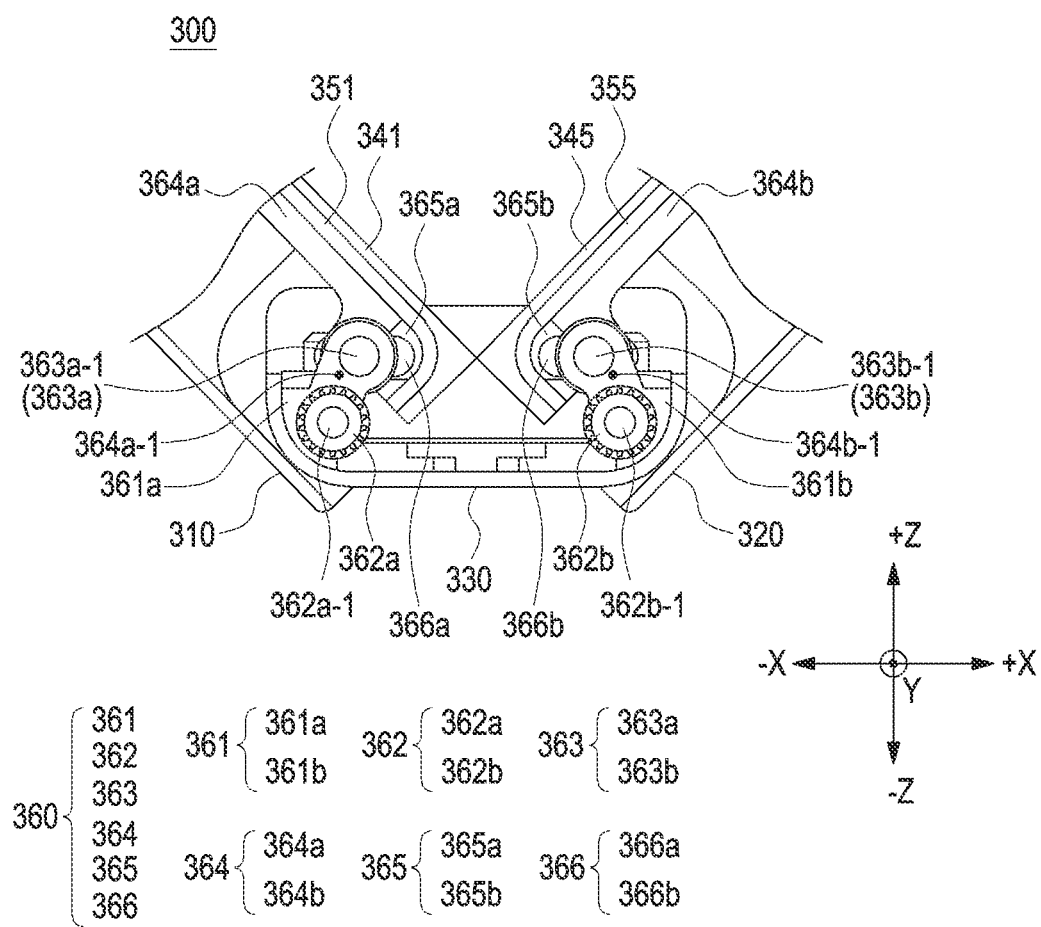
FIG. 6B is a cross-sectional view illustrating an intermediate state of an electronic device including multiple displays according to an embodiment of the disclosure.

FIG. 6B is a cross-sectional view illustrating an intermediate state of an electronic device including multiple displays according to an embodiment of the disclosure.

Figure 6C:
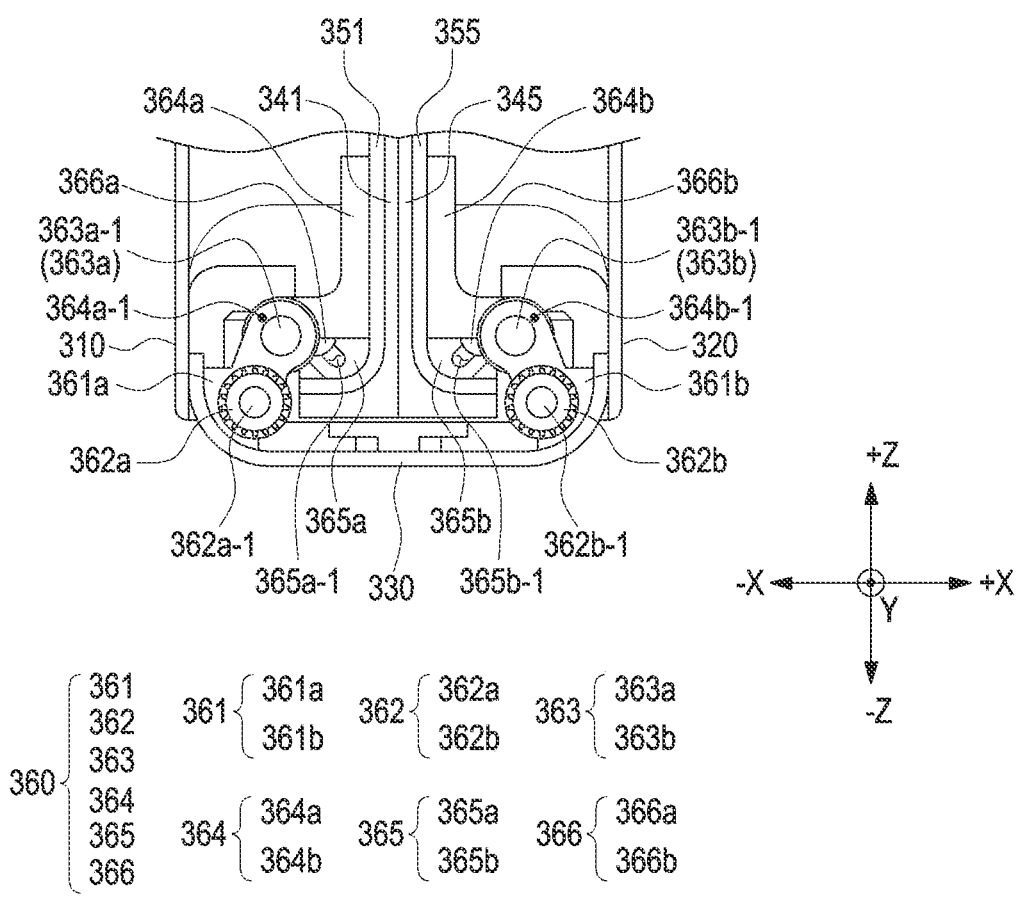
FIG. 6C is a cross-sectional view illustrating a folded state of an electronic device including multiple displays according to an embodiment of the disclosure.

FIG. 6C is a cross-sectional view illustrating a folded state of an electronic device including multiple displays according to an embodiment of the disclosure. For convenience of descriptions, a state where a portion of the first support members 361 is omitted is illustrated.

Referring to FIGS. 6A to 6C, an electronic device 300 (e.g., the electronic device 300 of FIG. 5) may include a first housing 310, a second housing 320, a hinge cover 330, a hinge module 360, a first display 351, a second display 355, a first glass member 341, and a second glass member 345.

The configuration of the first housing 310, the second housing 320, the hinge cover 330, the hinge module 360, the first display 351, the second display 355, the first glass member 341, and the second glass member 345 in FIGS. 6A to 6C may be wholly or partly the same as the configuration of the first housing 310, the second housing 320, the hinge cover 330, the hinge module 360, the first display 351, the second display 355, the first glass member 341, and the second glass member 345 in FIG. 5.

According to various embodiments, the (2-1)th support member 364a may include a (2-1)th shaft 364a-1 coupled to at least a portion of the (2-1)th gear 363a. The (2-1)th shaft 364a-1 may be coupled to a portion of the (2-1)th gear 363a, the portion being spaced apart from the rotation shaft 363a-1 of the (2-1)th gear 363a. According to an embodiment, the (2-1)th shaft 364a-1 may be eccentrically rotatable on the (2-1)th gear 363a.

According to various embodiments, the (2-2)th support member 364b may include a (2-2)th shaft 364b-1 coupled to at least a portion of the (2-2)th gear 363b. The (2-2)th shaft 364b-1 may be coupled to a portion of the (2-2)th gear 363b, the portion being spaced apart from the rotation shaft 363b-1 of the (2-2)th gear 363b. According to an embodiment, the (2-2)th shaft 364b-1 may be eccentrically rotated on the (2-2)th gear 363b.

Hereinafter, the operations of the electronic device 300 at the time of changing from an unfolded state to a folded state will be described. Hereinafter, for convenience of descriptions, the first display 351 and the components 361a, 362a, 363a, 364a, 365a, and 366a of the hinge module 360 related thereto will be described as an example, but these descriptions may be equally applied to the second display 355 and the components 361b, 362b, 363b, 364b, 365b and 366b of the hinge module 360 related thereto.

Referring to FIGS. 6A and 6B, operations at the time of changing of the electronic device 300 from an unfolded state (e.g., FIG. 6A) to an intermediate state (e.g., FIG. 6B) are described.

When the electronic device 300 changes the state thereof from an unfolded state to an intermediate state, the first display 351 and the first glass member 341 connected thereto may be rotated counterclockwise with respect to the (2-1)th shaft 364a-1 of the (2-1)th support member 364a, and the shaft of the (2-1)th support member 364a may be rotated counterclockwise on the (2-1)th gear 363a. For example, counterclockwise movement with respect to the (2-1)th shaft 364a-1 of the (2-1)th support member 364a and counterclockwise movement with respect to the rotation shaft 363a-1 of the (2-1)th gear 363a may be simultaneously applied to the first display 351. The first slot 365a-1 of the (3-1)th support member 365a may slide (e.g., a diagonal direction oriented to −X direction and −Z direction at the same time in FIGS. 6A and 6B) with respect to the shaft (not shown) of the (1-1)th fixing member 366a, and the (2-1)th shaft 364a-1 of the (2-1)th support member 364a may rotate the (2-1)th gear 363a counterclockwise. In addition, the (2-1)th gear 363a may rotate the (1-1)th gear 362a clockwise, and the (2-1)th gear 363a and the (2-2)th gear 363b may be rotatably supported by the (1-1)th support member 361a.

Referring to FIGS. 6B and 6C, operations at the time of changing of the electronic device 300 from an intermediate state (e.g., FIG. 6B) to a folded state (e.g., FIG. 6C) are described.

At the time of changing of the electronic device 300 from an intermediate state to a folded state, the first display 351 and the first glass member 341 connected thereto may be rotated counterclockwise with respect to the (2-1)th shaft 364a-1 of the (2-1)th support member 364a, and the shaft of the (2-1)th support member 364a may be rotated counterclockwise on the (2-1)th gear 363a. For example, counterclockwise movement with respect to the (2-1)th shaft 364a-1 of the (2-1)th support member 364a and counterclockwise movement with respect to the rotation shaft 363a-1 of the (2-1)th gear 363a may be simultaneously applied to the first display 351. The first slot 365a-1 of the (3-1)th support member 365a may slide (e.g., a diagonal direction oriented to +X direction and +Z direction at the same time in FIGS. 6B and 6C) with respect to the shaft (not shown) of the (1-1)th fixing member 366a, and the (2-1)th shaft 364a-1 of the (2-1)th support member 364a may rotate the (2-1)th gear 363a counterclockwise. In addition, the (2-1)th gear 363a may rotate the (1-1)th gear 362a clockwise, and the (2-1)th gear 363a and the (2-2)th gear 363b may be rotatably supported by the (1-1)th support member 361a.

According to various embodiments, at the time of changing of the electronic device 300 from a folded state to an unfolded state, movements of the first display 351 and the components connected thereto may be operated in an order reverse to the above described order.

Figure 7A:
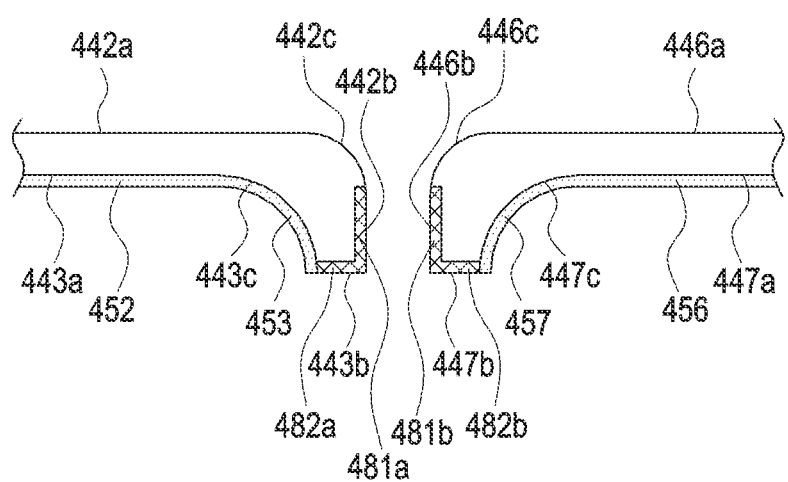
FIG. 7A is an exploded cross-sectional view of a first glass member and a second glass member according to an embodiment of the disclosure.

FIG. 7A is an exploded cross-sectional view of a first glass member and a second glass member according to an embodiment of the disclosure.

Figure 7B:
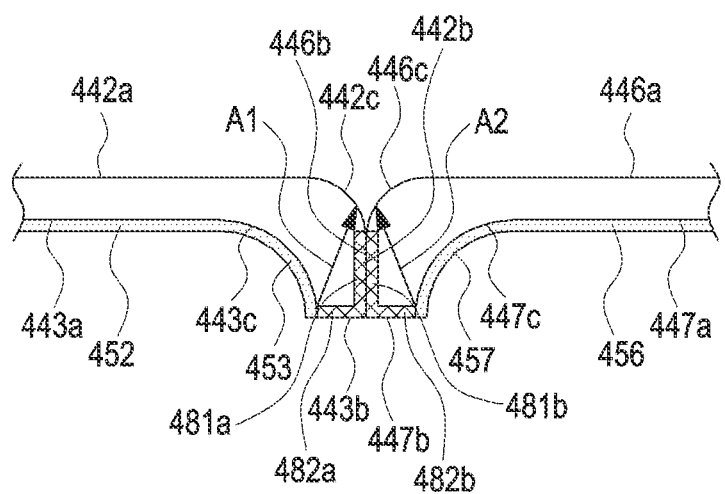
FIG. 7B is a cross-sectional view showing a first glass member and a second glass member coupled to each other according to an embodiment of the disclosure.

FIG. 7B is a cross-sectional view showing a first glass member and a second glass member coupled to each other according to an embodiment of the disclosure.

Figure 7C:
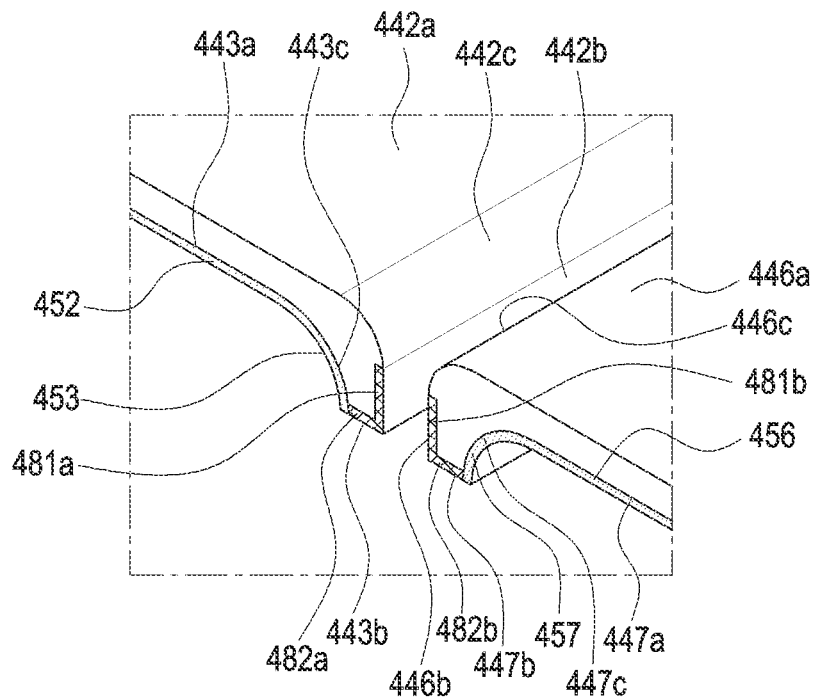
FIG. 7C is an exploded perspective view of a first glass member and a second glass member according to an embodiment of the disclosure.

FIG. 7C is an exploded perspective view of a first glass member and a second glass member according to an embodiment of the disclosure. For convenience of descriptions, a state where the first glass member and the second glass member are spaced apart from each other is illustrated in FIGS. 7A and 7C, but the first glass member and the second glass member may have the same arrangement relation as that in FIG. 7B when the first glass member and the second glass member are coupled to the electronic device.

Referring to FIGS. 7A to 7C, an electronic device (e.g., the electronic device 300 in FIGS. 5, 6A, 6B, and 6C) may include a first glass member 441, a second glass member 445, a first display 451, a second display 455, and light dispersion pattern layers 480.

The configuration of the first glass member 441, the second glass member 445, the first display 451, and the second display 455 in FIGS. 7A to 7C may be wholly or partly the same as the configuration of the first glass member 341, the second glass member 345, the first display 351, and the second display 355 in FIGS. 5, 6A, 6B, and 6C.

Hereinafter, for convenience of descriptions, the electronic device in an unfolded state is described as an example.

According to various embodiments, the first glass member 441 may include a first outer surface part 442 having at least a portion to be oriented to an exterior space of the electronic device and a first inner surface part 443 having at least a portion to be oriented to an interior space of the electronic device. According to an embodiment, at least a portion of the first inner surface part 443 may be oriented in a direction opposite to at least a portion of the first outer surface part 442.

According to an embodiment, the first outer surface part 442 may include a (1-1)th portion 442a which is a portion of a flat surface, a (1-2)th portion 442b which is disposed to be substantially perpendicular to the (1-1)th portion 442a, and a (1-3)th portion 442c configured to connect the (1-1)th portion 442a and the (1-2)th portion 442b to each other. According to an embodiment, the (1-3)th portion 442c may be configured to at least partially have a curvature.

According to an embodiment, the first inner surface part 443 may include a first inner surface portion 443a, a first curved portion 443c connected to the first inner surface portion 443a and having at least a portion configured to be curved, and a first connection portion 443b configured to connect the first curved portion 443c and the (1-2)th portion 442b to each other.

According to an embodiment, the first display 451 may include a first flat surface portion 452 stacked on or connected to the first inner surface portion 443a and a third curved portion 453 connected to the first flat surface portion 452 and having at least a portion configured to be curved. According to an embodiment, the third curved portion 453 may have a curvature corresponding to that of the first curved portion 443c, and be stacked on or connected to the first curved portion 443c. For example, the first curved portion 443c may have a first curvature, the third curved portion 453 may have a third curvature corresponding to the first curvature of the first curved portion 443c.

According to various embodiments, the second glass member 445 may include a second outer surface part 446 having at least a portion to be oriented to an exterior space of the electronic device and a second inner surface part 447 having at least a portion to be oriented to an interior space of the electronic device. According to an embodiment, at least a portion of the second inner surface part 447 may be oriented in a direction opposite to at least a portion of the second outer surface part 446.

According to an embodiment, the second outer surface part 446 may include a (2-1)th portion 446a which is a portion of a flat surface, a (2-2)th portion 446b which is disposed to be substantially perpendicular to the (2-1)th portion 446a, and a (2-3)th portion 446c configured to connect the (2-1)th portion 446a and the (2-2)th portion 446b to each other. According to an embodiment, the (2-3)th portion 446c may be configured to at least partially have a curvature.

According to an embodiment, the second inner surface part 447 may include a second inner surface portion 447a which is a portion of a flat surface, a second curved portion 447c connected to the second inner surface portion 447a and having at least a portion configured to be curved, and a second connection portion 447b configured to connect the second curved portion 447c and the (2-2)th portion 446b to each other.

According to an embodiment, the second display 455 may include a second flat surface portion 456 stacked on or connected to the second inner surface portion 447a and a fourth curved portion 457 connected to the second flat surface portion 456 and having at least a portion configured to be curved. According to an embodiment, the fourth curved portion 457 may have a curvature corresponding to that of the second curved portion 447c, and be stacked on or connected to the second curved portion 447c. For example, the second curved portion 447c may have a second curvature, the fourth curved portion 457 may have a fourth curvature corresponding to the second curvature of the second curved portion 447c.

According to various embodiments, the (1-1)th portion 442a may be disposed to face the (2-1)th portion 446a when the electronic device is in a folded state (e.g., FIG. 6C), and be disposed to be substantially parallel to the (2-1)th portion 446a when the electronic device is in an unfolded state (e.g., FIG. 6A).

According to various embodiments, the (1-2)th portion 442b may be disposed to be substantially parallel to the (2-2)th portion 446b when the electronic device is in a folded state (e.g., FIG. 6C), and may be disposed to face the (2-2)th portion 446b when the electronic device is in an unfolded state (e.g., FIG. 6A). According to an embodiment, the (1-2)th portion 442b and the (2-2)th portion 446b may be spaced apart from each other when the electronic device is in a folded state (e.g., FIG. 6C). According to an embodiment, the (1-2)th portion 442b and the (2-2)th portion 446b may be arranged to face each other and be in close contact with each other when the electronic device is in an unfolded state (e.g., FIG. 6A). According to an embodiment, the (1-2)th portion 442b and the (2-2)th portion 446b may be arranged to face each other and be spaced apart from each other while configuring a gap corresponding to a predetermined distance when the electronic device is in an unfolded state (e.g., FIG. 6A).

According to various embodiments, the electronic device may further include the light dispersion pattern layers 480. The light dispersion pattern layers 480 may include at least one among carbon, barium sulfate, titanium dioxide, polyester, epoxy, silane, and isophorone. The light dispersion pattern layers 480 may include various members configured to absorb light reaching the light dispersion pattern layers 480.

According to an embodiment, at least a portion of the light dispersion pattern layers 480 may be disposed on at least one among at least a portion of the (1-2)th portion 442b and at least a portion of the (2-2)th portion 446b.

According to various embodiments, the light dispersion pattern layers 480 may include a first light dispersion pattern layer 481a disposed on the (1-2)th portion 442b and a second light dispersion pattern layer 481b disposed on the (2-2)th portion 446b. According to an embodiment, the first light dispersion pattern layer 481a may configure at least a portion of the surface of the (1-2)th portion 442b, and the second light dispersion pattern layer 481b may configure at least a portion of the surface of the (2-2)th portion 446b.

According to various embodiments, the light dispersion pattern layers 480 may further include a third light dispersion pattern layer 482a disposed on the first connection portion 443b and a fourth light dispersion pattern layer 482b disposed on the second connection portion 447b. According to an embodiment, the third light dispersion pattern layer 482a may configure at least a portion of the surface of the first connection portion 443b, and the fourth light dispersion pattern layer 482b may configure at least a portion of the surface of the second connection portion 447b.

According to an embodiment, the first light dispersion pattern layer 481a and the second light dispersion pattern layer 481b may configure a luminance reduction structure 481. Referring to FIG. 7B, for example, in an electronic device without the luminance reduction structure 481, light emitted from at least a portion of the third curved portion 453 of the first display 451 may reach at least a portion (e.g., the (2-3)th portion 446c) of the second glass member 445, and light emitted from at least a portion of the fourth curved portion 457 of the second display 455 may reach at least a portion (e.g., the (1-3)th portion 442c) of the first glass member 441. All of the light emitted from the first display 451 and the second display 455 reaches the (1-3)th portion 442c and the (2-3)th portion 446c, and thus the (1-3)th portion 442c and the (2-3)th portion 446c may have excessively high luminance, thereby allowing a visually discontinuous image to be shown in a portion where displays are connected to each other. In addition, light emitted from the first display 451 and/or the second display 455 reaches portions (e.g., the (1-2)th portion 442b and the (2-2)th portion 446b) at which the first glass member 441 and the second glass member 445 face each other, and thus the portions at which the first glass member 441 and the second glass member 445 face each other may have excessively high luminance, thereby allowing a visually discontinuous image to be shown in a portion where displays are connected to each other.

According to various embodiments, the luminance reduction structure 481 may be configured to control a path of light to allow a continuous image to be formed at a portion where displays are connected to each other. According to an embodiment, the luminance reduction structure 481 may be configured to prevent light emitted from the third curved portion 453 of the first display 451 from reaching the (2-3)th portion 446c of the second glass member 445, and prevent light emitted from the fourth curved portion 457 of the second display 455 from reaching the (1-3)th portion 442c of the first glass member 441. In addition, the luminance reduction structure 481 may be configured to prevent light emitted from the first display 451 and/or the second display 455 from reaching portions (e.g., the (1-2)th portion 442b and the (2-2)th portion 446b) at which the first glass member 441 and the second glass member 445 face each other. According to an illustrated embodiment, light emitted from the third curved portion 453 may reach the exterior of the electronic device through the (1-3)th portion 442c by the luminance reduction structure 481 (see path A1 of FIG. 7B), and light emitted from the fourth curved portion 457 may reach the exterior of the electronic device through the (2-3)th portion 446c (see path A2 of FIG. 7B). Accordingly, the first glass member 441 may allow only light emitted from the first display 451 to pass therethrough, and the second glass member 445 may allow only light emitted from the second display 455 to pass therethrough, thereby allowing a continuous image to be formed at a portion where displays are connected to each other.

According to an embodiment, the first light dispersion pattern layer 481a and the second light dispersion pattern layer 481b may be configured to form the luminance reduction structure 481 at boundary surfaces (e.g., the (1-2)th portion 442b and the (2-2)th portion 446b facing each other) between the first display 451 and the second display 455.

According to an embodiment, the third light dispersion pattern layer 482a and the fourth light dispersion pattern layer 482b may form a light leakage reduction structure 482. Referring to FIG. 7B, for example, in an electronic device in which the luminance reduction structure 481 is not disposed, light emitted from at least a portion of the third curved portion 453 of the first display 451 may be emitted along the surfaces of the first connection portion 443b and the (1-2)th portion 442b, and light emitted from at least a portion of the fourth curved portion 457 of the second display 455 may be emitted along the surfaces of the second connection portion 447b and the (2-2)th portion 446b. Accordingly, light may be excessively emitted from portions at which the (1-2)th portion 442b and the (2-2)th portion 446b are connected to each other, and a light leakage phenomenon may be visually recognized at the portions.

According to an embodiment, the third light dispersion pattern layer 482a may be integrally configured with the first light dispersion pattern layer 481a, and the fourth light dispersion pattern layer 482b may be integrally configured with the second light dispersion pattern layer 481b. According to an embodiment, the third light dispersion pattern layer 482a may be a shape which extends from the first light dispersion pattern layer 481a, and the fourth light dispersion pattern layer 482b may be a shape which extends from the second light dispersion pattern layer 481b. According to an embodiment, the third light dispersion pattern layer 482a may be configured separately from the first light dispersion pattern layer 481a, and the fourth light dispersion pattern layer 482b may be configured separately from the second light dispersion pattern layer 481b.

According to an embodiment, when the electronic device is folded or unfolded, at least one among the first light dispersion pattern layer 481a and the second light dispersion pattern layer 481b may further include a coating layer (not shown) which absorb an impact that may occur when the first light dispersion pattern layer 481a and the second light dispersion pattern layer 481b come into contact with each other. The coating layer (not shown) may be formed by applying a coating material to at least one among the first light dispersion pattern layer 481a and the second light dispersion pattern layer 481b. The coating material may include at least one among a silica material, a silicone material, an acrylic material, and a fluorine material. According to various embodiments, the light leakage reduction structure 482 may be configured to reduce a light leakage phenomenon and thus allow a continuous image to be formed at portions at which displays are connected to each other. According to an embodiment, the light leakage reduction structure 482 is configured to prevent light emitted from the third curved portion 453 of the first display 451 from traveling along the surface of the first connection portion 443b, and is configured to prevent light emitted from the fourth curved portion 457 of the second display 455 from traveling along the surface of the second connection portion 447b. Accordingly, traveling of light through the connection portions (443b, 447b) and the connection portions (e.g., 442b, 446b) may be restricted, and a light leakage phenomenon may be reduced.

According to various embodiments, the light dispersion pattern layers 480 may be formed via an ink transfer process. According to an embodiment, the light dispersion pattern layers 480 may be formed on at least a portion (e.g., the (1-2)th portion 442b or the first connection portion 443b) of the first glass member 441 and at least a portion (e.g., the (2-2)th portion 446b or the second connection portion 447b) of the second glass member 445 via an ink transfer process. For example, in the ink transfer process, ink including a mixture including at least one among carbon, barium sulfate, titanium dioxide, polyester, epoxy, silane, and isophorone may be transferred in a groove disposed on a printing plate such as an etching plate or a metal mask, and a process in which ink transferred in the groove is transferred on at least a portion of the first glass member 441 or at least a portion of the second glass member 445 may be performed.

According to various embodiments, the light dispersion pattern layers 480 may be formed via an ink coating process. According to an embodiment, the light dispersion pattern layers 480 may be formed on at least a portion (e.g., the (1-2)th portion 442b or the first connection portion 443b) of the first glass member 441 and at least a portion (e.g., the (2-2)th portion 446b or the second connection portion 447b) of the second glass member 445 via an ink coating process. For example, in the ink coating process, ink including a mixture including at least one among carbon, barium sulfate, titanium dioxide, polyester, epoxy, silane, and isophorone may be coated on a roller, and then a process in which the ink coated on the roller is coated on at least a portion of the first glass member 441 or at least a portion of the second glass member 445 may be performed.

According to various embodiments, the thickness of the light dispersion pattern layers 480 may be about 10 micro meters (um) to about 30 μm. For example, the thickness (e.g., the thickness in the X axis direction of FIGS. 6A to 6C) of the first light dispersion pattern layer 481a and the second light dispersion pattern layer 481b may be about 10 μm to about 30 μm. For example, the thickness (e.g., the thickness in the Z axis direction of FIGS. 6A to 6C) of the third light dispersion pattern layer 482a and the fourth light dispersion pattern layer 482b may be about 10 μm to about 30 um.

According to various embodiments, the height of the light dispersion pattern layer may be about 0.05 mm to about 0.55 mm. For example, the height (e.g., the height in the Z axis direction of FIGS. 6A to 6C) of the first light dispersion pattern layer 481a and the second light dispersion pattern layer 481b may be about 0.05 mm to about 0.55 mm.

According to various embodiments, the first light dispersion pattern layer 481a and the second light dispersion pattern layer 481b may be arranged to face each other when the first housing 310 (e.g., the first housing 310 of FIG. 6A) and the second housing 320 (e.g., the second housing 320 of FIG. 6A) are in an unfolded state (e.g., FIG. 6A), and be arranged toward the hinge cover (not shown) (e.g., the hinge cover 330 in FIG. 6C) when the first housing 310 and the second housing 320 are in a folded state.

According to various embodiments, the third light dispersion pattern layer 482a and the fourth light dispersion pattern layer 482b may be arranged toward the hinge cover (not shown) (e.g., the hinge cover 330 of FIG. 6C) when the first housing 310 and the second housing 320 are in an unfolded state (e.g., FIG. 6A), and be arranged to be parallel to each other when the first housing 310 and the second housing 320 are in a folded state (e.g., FIG. 6C).

According to an illustrated embodiment, the first light dispersion pattern layer 481a may be disposed in a recessed groove of the (1-2)th portion 442b. According to an embodiment (not shown), the first light dispersion pattern layer 481a may be disposed on the surface of the (1-2)th portion 442b, which does not have a groove thereon.

According to an illustrated embodiment, the second light dispersion pattern layer 481b may be disposed in a recessed groove of the (2-2)th portion 446b. According to an embodiment (not shown), the second light dispersion pattern layer 481b may be disposed on the surface of the (2-2)th portion 446b, which does not have a groove thereon.

Referring to FIGS. 7A to 7C, the height (e.g., the height in the Z axis direction of FIGS. 6A to 6C) of the first light dispersion pattern layer 481a may be substantially the same as the height (e.g., the height in the Z axis direction of FIGS. 6A to 6C) of the (1-2)th portion 442b and the height (e.g., the height in the Z axis direction of FIGS. 6A to 6C) of the (2-2)th portion 446b.

According to various embodiments, the first light dispersion pattern layer 481a may be connected to at least a portion of the third light dispersion pattern layer 482a, and the second light dispersion pattern layer 481b may be connected to at least a portion of the fourth light dispersion pattern layer 482b.

Figure 8:
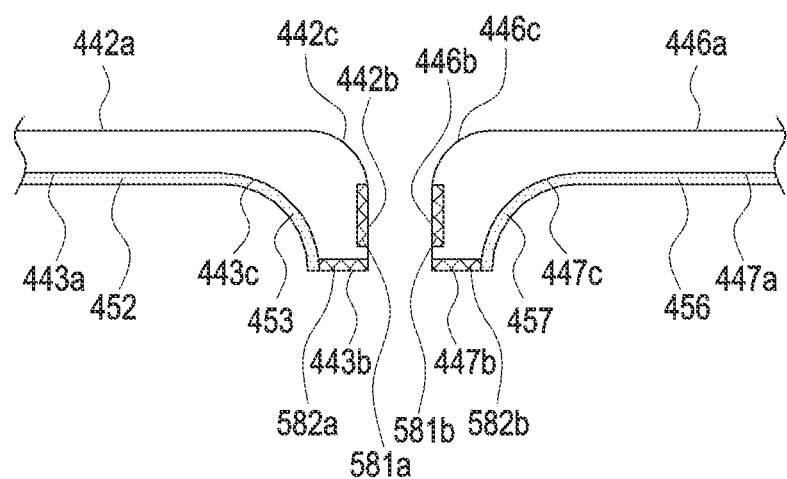
FIG. 8 is a cross-sectional view illustrating a first glass member and a second glass member according to an embodiment of the disclosure.

FIG. 8 is a cross-sectional view illustrating a first glass member and a second glass member according to an embodiment of the disclosure. For convenience of description, a state in which the first glass member and the second glass member are spaced apart from each other is illustrated in FIG. 8, but the arrangement relation of the first glass member and the second glass member may be the same as that in FIG. 7B when the first glass member and the second glass member are coupled to the electronic device.

Referring to FIG. 8, an electronic device (e.g., the electronic device 300 of FIGS. 5, 6A, 6B, and 6C) may include a first glass member 441, a second glass member 445, a first display 451, a second display 455, and light dispersion pattern layers 580.

The configuration of the first glass member 441, the second glass member 445, the first display 451, the second display 455, and the light dispersion pattern layers 580 in FIG. 8 may be wholly or partly the same as the configuration of the first glass member 341, the second glass member 345, the first display 351, the second display 355, and the light dispersion pattern layers 480 in FIGS. 6A to 6C.

According to various embodiments, the height (e.g., the height in the Z axis direction of FIGS. 6A to 6C) of a first light dispersion pattern layer 581a may be smaller than the height (e.g., the height in the Z axis direction of FIGS. 6A to 6C) of the (1-2)th portion 442b, and the height (e.g., the height in the Z axis direction of FIGS. 6A to 6C) of a second light dispersion pattern layer 581b may be smaller than the height (e.g., the height in the Z axis direction of FIGS. 6A to 6C) of the (2-2)th portion 446b.

According to an embodiment, the height (e.g., the height in the Z axis direction of FIGS. 6A to 6C) of the first light dispersion pattern layer 581a may be configured or determined depending on the value of the curvature of the third curved portion 453 of the first display 451 or the value of the curvature of the (1-3)th portion 442c of the first glass member 441. According to an embodiment, the height of the first light dispersion pattern layer 581a may be configured or determined depending on the configured maximum brightness of the first display 451. According to an embodiment, the height (e.g., the height in the Z axis direction of FIGS. 6A to 6C) of the second light dispersion pattern layer 581b may be configured or determined depending on the value of the curvature of the fourth curved portion 457 of the second display 455 or the value of the curvature of the (2-3)th portion 446c of the second glass member 445. According to an embodiment, the height of the second light dispersion pattern layer 581b may be configured or determined depending on the configured maximum brightness of the second display 455. According to an embodiment, the first light dispersion pattern layer 581a and the second light dispersion pattern layer 581b may configure a luminance reduction structure 581.

According to an embodiment, the first light dispersion pattern layer 581a may not be connected to and spaced apart from a third light dispersion pattern layer 582a. According to an embodiment, the second light dispersion pattern layer 581b may not be connected to and spaced apart from a fourth light dispersion pattern layer 582b. According to an embodiment, the third light dispersion pattern layer 582a and the fourth light dispersion pattern layer 582b may form a light leakage reduction structure 582.

According to an embodiment, the first light dispersion pattern layer 581a may extend from the upper end (e.g., an end portion of the (1-2)th portion 442b, the end portion being connected to the (1-3)th portion 442c) of the (1-2)th portion 442b toward the lower end (e.g., an end portion of the (1-2)th portion 442b, the end portion being connected to the first connection portion 443b) of the (1-2)th portion 442b, and be disposed to be spaced apart from the third light dispersion pattern layer 582a. According to an embodiment, the upper end of the first light dispersion pattern layer 581a may be disposed to be in contact with the (1-3)th portion 442c.

According to an embodiment, the second light dispersion pattern layer 581b may extend from the upper end (e.g., an end portion of the (2-2)th portion 446b, the end portion being connected to the (2-3)th portion 446c) of the (2-2)th portion 446b toward the lower end (e.g., an end portion of the (2-2)th portion 446b, the end portion being connected to the second connection portion 447b) of the (2-2)th portion 446b, and be disposed to be spaced apart from the fourth light dispersion pattern layer 582b. According to an embodiment, the upper end of the second light dispersion pattern layer 581b may be disposed to be in contact with the (2-3)th portion 446c.

Figure 9:
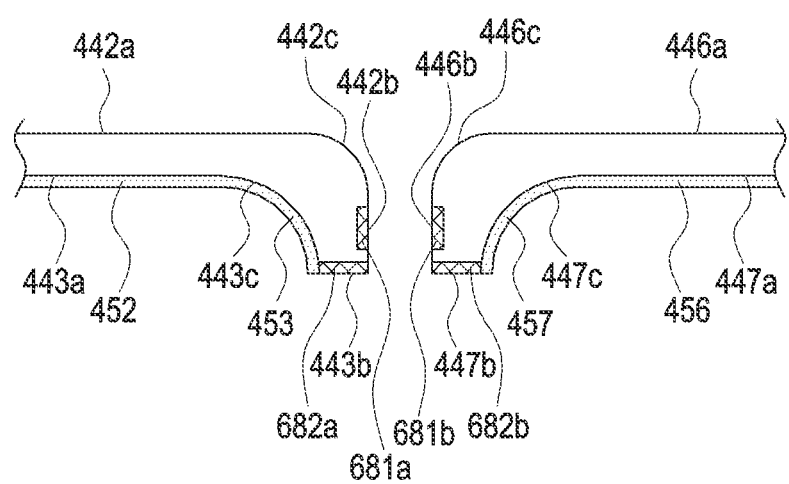
FIG. 9 is a cross-sectional view illustrating a first glass member and a second glass member according to an embodiment of the disclosure.

FIG. 9 is a cross-sectional view illustrating a first glass member and a second glass member according to an embodiment of the disclosure. For convenience of descriptions, a state in which the first glass member and the second glass member are spaced apart from each other is illustrated in FIG. 9, but the arrangement relation of the first glass member and the second glass member may be the same as that in FIG. 7B when the first glass member and the second glass member are coupled to the electronic device.

Referring to FIG. 9, an electronic device (e.g., the electronic device 300 of FIGS. 5, 6A, 6B, and 6C) may include a first glass member 441, a second glass member 445, a first display 451, a second display 455, and light dispersion pattern layers 680.

The configuration of the first glass member 441, the second glass member 445, the first display 451, the second display 455, and the light dispersion pattern layers 680 in FIG. 9 may be wholly or partly the same as the configuration of the first glass member 341, the second glass member 345, the first display 351, the second display 355, and the light dispersion pattern layers 480 in FIGS. 6A to 6C.

According to various embodiments, the height (e.g., the height in the Z axis direction of FIGS. 6A to 6C) of a first light dispersion pattern layer 681a may be smaller than the height (e.g., the height in the Z axis direction of FIGS. 6A to 6C) of the (1-2)th portion 442b, and the height (e.g., the height in the Z axis direction of FIGS. 6A to 6C) of a second light dispersion pattern layer 681b may be smaller than the height (e.g., the height in the Z axis direction of FIGS. 6A to 6C) of the (2-2)th portion 446b. According to an embodiment, the first light dispersion pattern layer 681a and the second light dispersion pattern layer 681b may configure a luminance reduction structure 681.

According to an embodiment, the height (e.g., the height in the Z axis direction of FIGS. 6A to 6C) of the first light dispersion pattern layer 681a may be configured or determined depending on the value of the curvature of the third curved portion 453 of the first display 451 or the value of the curvature of the (1-3)th portion 442c of the first glass member 441. According to an embodiment, the height of the first light dispersion pattern layer 681a may be configured or determined depending on the configured maximum brightness of the first display 451. According to an embodiment, the height (e.g., the height in the Z axis direction of FIGS. 6A to 6C) of the second light dispersion pattern layer 681b may be configured or determined depending on the value of the curvature of the fourth curved portion 457 of the second display 455 or the value of the curvature of the (2-3)th portion 446c of the second glass member 445. According to an embodiment, the height of the second light dispersion pattern layer 681b may be configured or determined depending on the configured maximum brightness of the second display 455.

According to an embodiment, the first light dispersion pattern layer 681a may not be connected to and spaced apart from a third light dispersion pattern layer 682a. According to an embodiment, the second light dispersion pattern layer 681b may not be connected to and spaced apart from a fourth light dispersion pattern layer 682b. According to an embodiment, the third light dispersion pattern layer 682a and the fourth light dispersion pattern layer 682b may form a light leakage reduction structure 682.

According to an embodiment, the first light dispersion pattern layer 681a may extend from the upper end (e.g., an end portion of the (1-2)th portion 442b, the end portion being connected to the (1-3)th portion 442c) of the (1-2)th portion 442b toward the lower end (e.g., an end portion of the (1-2)th portion 442b, the end portion being connected to the first connection portion 443b) of the (1-2)th portion 442b, and be disposed to be spaced apart from the third light dispersion pattern layer 682a. According to an embodiment, the upper end of the first light dispersion pattern layer 681a may be disposed to be spaced apart from the lower end (e.g., a portion connected to the (1-2)th portion 442b) of the (1-3)th portion 442c.

According to an embodiment, the second light dispersion pattern layer 681b may extend from the upper end (e.g., an end portion of the (2-2)th portion 446b, the end portion being connected to the (2-3)th portion 446c) of the (2-2)th portion 446b toward the lower end (e.g., an end portion of the (2-2)th portion 446b, the end portion being connected to the second connection portion 447b) of the (2-2)th portion 446b, and be disposed to be spaced apart from the fourth light dispersion pattern layer 682b. According to an embodiment, the upper end of the second light dispersion pattern layer 681b may be disposed to be spaced apart from the lower end (e.g., a portion connected to the (2-2)th portion 446b) of the (2-3)th portion 446c.

Figure 10:
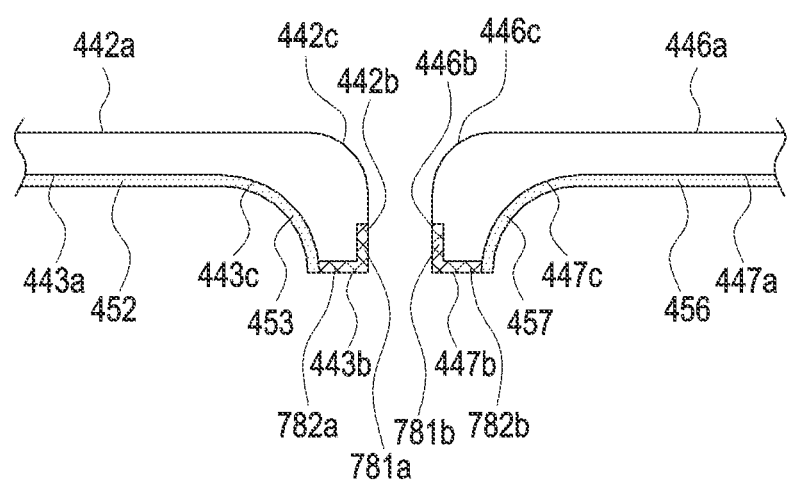
FIG. 10 is a cross-sectional view illustrating a first glass member and a second glass member according to an embodiment of the disclosure.

FIG. 10 is a cross-sectional view illustrating a first glass member and a second glass member according to an embodiment of the disclosure. For convenience of descriptions, a state in which the first glass member and the second glass member are spaced apart from each other is illustrated in FIG. 10, but the arrangement relation of the first glass member and the second glass member may be the same as that in FIG. 7B when the first glass member and the second glass member are coupled to the electronic device.

Referring to FIG. 10, an electronic device (e.g., the electronic device 300 of FIGS. 5, 6A, 6B, and 6C) may include a first glass member 441, a second glass member 445, a first display 451, a second display 455, and light dispersion pattern layers 780.

The configuration of the first glass member 441, the second glass member 445, the first display 451, the second display 455, and the light dispersion pattern layers 780 in FIG. 10 may be wholly or partly the same as the configuration of the first glass member 341, the second glass member 345, the first display 351, the second display 355, and the light dispersion pattern layers 480 in FIGS. 6A to 6C.

According to various embodiments, the height (e.g., the height in the Z axis direction of FIGS. 6A to 6C) of a first light dispersion pattern layer 781a may be smaller than the height (e.g., the height in the Z axis direction of FIG. 6A to 6C) of the (1-2)th portion 442b, and the height (e.g., the height in the Z axis direction of FIGS. 6A to 6C) of a second light dispersion pattern layer 781b may be smaller than the height (e.g., the height in the Z axis direction of FIGS. 6A to 6C) of the (2-2)th portion 446b. According to an embodiment, the first light dispersion pattern layer 781a and the second light dispersion pattern layer 781b may configure a luminance reduction structure 781.

According to an embodiment, the height (e.g., the height in the Z axis direction of FIGS. 6A to 6C) of the first light dispersion pattern layer 781a may be configured or determined depending on the value of the curvature of the third curved portion 453 of the first display 451 or the value of the curvature of the (1-3)th portion 442c of the first glass member 441. According to an embodiment, the height of the first light dispersion pattern layer 781a may be configured or determined depending on the configured maximum brightness of the first display 451. According to an embodiment, the height (e.g., the height in the Z axis direction of FIGS. 6A to 6C) of the second light dispersion pattern layer 781b may be configured or determined depending on the value of the curvature of the fourth curved portion 457 of the second display 455 or the value of the curvature of the (2-3)th portion 446c of the second glass member 445. According to an embodiment, the height of the second light dispersion pattern layer 781b may be configured or determined depending on the configured maximum brightness of the second display 455.

According to an embodiment, the first light dispersion pattern layer 781a may be connected to a third light dispersion pattern layer 782a. According to an embodiment, the second light dispersion pattern layer 781b may be connected to a fourth light dispersion pattern layer 782b. According to an embodiment, the third light dispersion pattern layer 782a and the fourth light dispersion pattern layer 782b may form a light leakage reduction structure 782.

According to an embodiment, the first light dispersion pattern layer 781a may extend from the upper end (e.g., an end portion of the (1-2)th portion 442b, the end portion being connected to the (1-3)th portion 442c) of the (1-2)th portion 442b toward the lower end (e.g., an end portion of the (1-2)th portion 442b, the end portion being connected to the first connection portion 443b) of the (1-2)th portion 442b, and be connected to the third light dispersion pattern layer 782a. According to an embodiment, the upper end of the first light dispersion pattern layer 781a may be disposed to be spaced apart from the (1-3)th portion 442c.

According to an embodiment, the second light dispersion pattern layer 781b may extend from the upper end (e.g., an end portion of the (2-2)th portion 446b, the end portion being connected to the (2-3)th portion 446c) of the (2-2)th portion 446b toward the lower end (e.g., an end portion of the (2-2)th portion 446b, the end portion being connected to the second connection portion 447b) of the (2-2)th portion 446b, and be connected to the fourth light dispersion pattern layer 782b. According to an embodiment, the upper end of the second light dispersion pattern layer 781b may be disposed to be spaced apart from the (2-3)th portion 446c.

According to various embodiments of the disclosure, an electronic device (e.g., the electronic device 300 of FIG. 5) may include: a housing including a first housing (e.g., the first housing 310 of FIG. 5) and a second housing (e.g., the second housing 320 of FIG. 5) configured to provide relative movement with respect to the first housing; a hinge structure (e.g., the hinge module 360 of FIG. 5) configured to connect the first housing and the second housing rotatably from a folded state to an unfolded state; a first glass member (e.g., the first glass member 341 of FIGS. 5, 6A, 6B, and 6C or the first glass member 441 of FIGS. 7A to 7C) disposed in the first housing and including a first outer surface part (e.g., the first outer surface part 442 of FIGS. 7A to 7C) including a (1-1)th portion (e.g., the (1-1)th portion 442a of FIGS. 7A to 7C) and a (1-2)th portion (e.g., the (1-2)th portion 442b of FIGS. 7A to 7C) disposed to be substantially perpendicular to the (1-1)th portion and a first inner surface part (e.g., the first inner surface part 443 of FIGS. 7A to 7C) including a first curved portion (e.g., the first curved portion 443c of FIGS. 7A to 7C) formed in at least a portion of the first inner surface part; a second glass member (e.g., the second glass member 345 of FIGS. 5, 6A, 6B, and 6C or the second glass member 345 of FIGS. 7A to 7C) disposed in the second housing and including a second outer surface part (e.g., the second outer surface part 446 of FIGS. 7A to 7C) including a (2-1)th portion (e.g., the (2-1)th portion 446a of FIGS. 7A to 7C) and a (2-2)th portion (e.g., the (2-2)th portion 446b of FIGS. 7A to 7C) disposed to be substantially perpendicular to the (2-1)th portion and a second inner surface part (e.g., the second inner surface part 447 of FIGS. 7A to 7C) including a second curved portion (e.g., the second curved portion 447c of FIGS. 7A to 7C) formed in at least a portion of the second inner surface part; a first display (e.g., the first display 451 of FIGS. 7A to 7C) disposed between the first housing and the first glass member and including a third curved portion (e.g., the third curved portion 453 of FIGS. 7A to 7C) formed in at least a portion of the first display to have a third curvature corresponding to a first curvature of the first curved portion; a second display (e.g., the second display 455 of FIGS. 7A to 7C) disposed between the second housing and the second glass member and including a fourth curved portion (e.g., the fourth curved portion 457 of FIGS. 7A to 7C) formed in at least a portion of the second display to include a fourth curvature corresponding to a second curvature of the second curved portion; and a light dispersion pattern layer (e.g., the light dispersion pattern layers 480 of FIGS. 7A to 7C) including at least a portion disposed on at least one among at least a portion of the (1-2)th portion and at least a portion of the (2-2)th portion.

According to various embodiments, the light dispersion pattern layer may include a first light dispersion pattern layer (e.g., the first light dispersion pattern layer 481a of FIGS. 7A to 7C) disposed on the (1-2)th portion and a second light dispersion pattern layer (e.g., the second light dispersion pattern layer 481b of FIGS. 7A to 7C) comprising at least a portion disposed on the (2-2)th portion.

According to various embodiments, the height (e.g., the height in the Z axis direction of FIGS. 6A to 6C) of the first light dispersion pattern layer (e.g., the first light dispersion pattern layer 481a of FIGS. 7A to 7C) may be substantially the same as the height (e.g., the height in the Z axis direction of FIGS. 6A to 6C) of the (1-2)th portion, and the height (e.g., the height in the Z axis direction of FIGS. 6A to 6C) of the second light dispersion pattern layer (e.g., the second light dispersion pattern layer 481b of FIGS. 7A to 7C) may be substantially the same as the height (e.g., the height in the Z axis direction of FIGS. 6A to 6C) of the (2-2)th portion.

According to various embodiments, the height (e.g., the height in the Z axis direction of FIGS. 6A to 6C) of the first light dispersion pattern layer (e.g., the first light dispersion pattern layer 581a of FIG. 8, the first light dispersion pattern layer 681a of FIG. 9, or the first light dispersion pattern layer 781a of FIG. 10) may be smaller than the height (e.g., the height in the Z axis direction of FIGS. 6A to 6C) of the (1-2)th portion, and the height (e.g., the height in the Z axis direction of FIGS. 6A to 6C) of the second light dispersion pattern layer (e.g., the second light dispersion pattern layer 581b of FIG. 8, the second light dispersion pattern layer 681b of FIG. 9, or the second light dispersion pattern layer

781*b* of FIG. 10) may be smaller than the height (e.g., the height in the Z axis direction of FIGS. 6A to 6C) of the (2-2)th portion.

According to various embodiments, the first inner surface part may further include a first connection portion (e.g., the first connection portion 443*b* of FIGS. 7A to 7C) configured to connect the first curved portion and the (1-2)th portion to each other, and the second inner surface part may further include a second connection portion (e.g., the second connection portion 447*b* of FIGS. 7A to 7C) configured to connect the second curved portion and the (2-2)th portion.

According to various embodiments, the light dispersion pattern layers may include: a first light dispersion pattern layer (e.g., the first light dispersion pattern layer 481*a* of FIGS. 7A to 7C) including at least a portion disposed on the (1-2)th portion; a second light dispersion pattern layer (e.g., the second light dispersion pattern layer 481*b* of FIGS. 7A to 7C) including at least a portion disposed on the (2-2)th portion; a third light dispersion pattern layer (e.g., the third light dispersion pattern layer 482*a* of FIGS. 7A to 7C) including at least a portion disposed on the first connection portion; and a fourth light dispersion pattern layer (e.g., the fourth light dispersion pattern layer 482*b* of FIGS. 7A to 7C) including at least a portion disposed on the second connection portion.

According to various embodiments, the first light dispersion pattern layer (e.g., the first light dispersion pattern layer 481*a* of FIGS. 7A to 7C or the first light dispersion pattern layer 781*a* of FIG. 10) may be connected to the third light dispersion pattern layer (e.g., the third light dispersion pattern layer 482*a* of FIGS. 7A to 7C or the third light dispersion pattern layer 782*a* of FIG. 10), and the second light dispersion pattern layer (e.g., the second light dispersion pattern layer 481*b* of FIGS. 7A to 7C or the second light dispersion pattern layer 781*b* of FIG. 10) may be connected to the fourth light dispersion pattern layer (e.g., the fourth light dispersion pattern layer 482*b* of FIGS. 7A to 7C or the fourth light dispersion pattern layer 782*b* of FIG. 10).

According to various embodiments, the first light dispersion pattern layer (e.g., the first light dispersion pattern layer 581*a* of FIG. 8 or the first light dispersion pattern layer 681*a* of FIG. 9) may be disposed to be spaced apart from the third light dispersion pattern layer (e.g., the third light dispersion pattern layer 582*a* of FIG. 8 or the third light dispersion pattern layer 682*a* of FIG. 9), and the second light dispersion pattern layer (e.g., the second light dispersion pattern layer 581*b* of FIG. 8 or the second light dispersion pattern layer 681*b* of FIG. 9) may be disposed to be spaced apart from the fourth light dispersion pattern layer (e.g., the fourth light dispersion pattern layer 582*b* of FIG. 8 or the fourth light dispersion pattern layer 682*b* of FIG. 9).

According to various embodiments, the (1-1)th portion may be disposed to face the (2-1)th portion when the first housing and the second housing are in a folded state (e.g., FIG. 6C), and be disposed to be substantially parallel to the (2-1)th portion when the first housing and the second housing are in an unfolded state (e.g., FIG. 6A), and the (1-2)th portion may be disposed to be substantially parallel to the (2-2)th portion when the first housing and the second housing are in a folded state, and be disposed to face the (2-2)th portion when the first housing and the second housing are in an unfolded state.

According to various embodiments, the electronic device may further include a hinge cover (e.g., the hinge cover 330 of FIGS. 6A to 6C) configured to cover at least a portion of the hinge structure, at least a portion of at least one among the first outer surface part and the second outer surface part may be disposed to be oriented toward the hinge cover when the first housing and the second housing are in a folded state (e.g., FIG. 6C), and at least a portion of at least one among the first inner surface part and the second inner surface part may be disposed to be oriented toward the hinge cover when the first housing and the second housing are in an unfolded state (e.g., FIG. 6A).

According to various embodiments, the light dispersion pattern layer may include: a first light dispersion pattern layer (e.g., the first light dispersion pattern layer 481*a* of FIGS. 7A to 7C) disposed on the (1-2)th portion; a second light dispersion pattern layer (e.g., the second light dispersion pattern layer 481*b* of FIGS. 7A to 7C) disposed on the (2-2)th portion; a third light dispersion pattern layer (e.g., the third light dispersion pattern layer 482*a* of FIGS. 7A to 7C) comprising at least a portion disposed on the first inner surface part; and a fourth light dispersion pattern layer (e.g., the fourth light dispersion pattern layer 482*b* of FIGS. 7A to 7C) comprising at least a portion disposed on the second inner surface part, the first light dispersion pattern layer and the second light dispersion pattern layer may be arranged to face each other when the first housing and the second housing are in an unfolded state (e.g., FIG. 6A), and be arranged to be oriented toward the hinge cover when the first housing and the second housing are in a folded state (e.g., FIG. 6C), and the third light dispersion pattern layer and the fourth light dispersion pattern layer may be arranged to be oriented toward the hinge cover when the first housing and the second housing are in an unfolded state (e.g., FIG. 6A), and be arranged to be parallel to each other when the first housing and the second housing are in a folded state (e.g., FIG. 6C).

According to various embodiments, the light dispersion pattern layer may include at least one among carbon, barium sulfate, titanium dioxide, polyester, epoxy, silane, and isophorone.

According to various embodiments, the light dispersion pattern layers may be formed via at least one among an ink transfer process or an ink coating process.

According to various embodiments, the thickness of the light dispersion pattern layer may be in a range of 10 μm to 30 μm, and the height of the light dispersion pattern layers may be in a range of 0.05 mm to 0.55 mm.

According to various embodiments, the (1-2)th portion and the (2-2)th portion may be in close contact with each other when the first housing and the second housing are in an unfolded state (e.g., FIG. 6A or 7B).

According to various embodiments of the disclosure, an electronic device (e.g., the electronic device 300 of FIG. 5) may include: a housing including a first housing (e.g., the first housing 310 of FIG. 5) and a second housing (e.g., the second housing 320 of FIG. 5) configured to provide relative movement with respect to the first housing; a hinge structure (e.g., the hinge module 360 of FIG. 5) configured to connect the first housing and the second housing and allow the first housing and the second housing to rotate from a folded state to an unfolded state; a first glass member (e.g., the first glass member 341 of FIGS. 5, 6A, 6B, and 6C or the first glass member 441 of FIGS. 7A to 7C) disposed in the first housing and including a first outer surface part (e.g., the first outer surface part 442 of FIGS. 7A to 7C) including a (1-1)th portion (e.g., the (1-1)th portion 442*a* of FIGS. 7A to 7C) and a (1-2)th portion (e.g., the (1-2)th portion 442*b* of FIGS. 7A to 7C) disposed to be substantially perpendicular to the (1-1)th portion and a first inner surface part (e.g., the first inner surface part 443 of FIGS. 7A to 7C) including a first curved portion (e.g., the first curved portion 443*c* of FIGS.

7A to 7C) formed in at least a portion of the first inner surface part; a second glass member (e.g., the second glass member 345 of FIGS. 5, 6A, 6B, and 6C or the second glass member 345 of FIGS. 7A to 7C) disposed in the second housing and including a second outer surface part (e.g., the second outer surface part 446 of FIGS. 7A to 7C) including a (2-1)th portion (e.g., the (2-1)th portion 446a of FIGS. 7A to 7C) and a (2-2)th portion (e.g., the (2-2)th portion of FIGS. 7A to 7C) disposed to be substantially perpendicular to the (2-1)th portion and a second inner surface part (e.g., the second inner surface part 447 of FIGS. 7A to 7C) including a second curved portion (e.g., the second curved portion 447c of FIGS. 7A to 7C) formed in at least a portion of the second inner surface part; a first display (e.g., the first display 451 of FIGS. 7A to 7C) disposed between the first housing and the first glass member, the first display including a third curved portion (e.g., the third curved portion 453 of FIGS. 7A to 7C) formed in at least a portion of the first display to have a third curvature corresponding to a first curvature of the first curved portion; a second display (e.g., the second display 455 of FIGS. 7A to 7C) disposed between the second housing and the second glass member, the second display including a fourth curved portion (e.g., the fourth curved portion 457 of FIGS. 7A to 7C) formed in at least a portion of the second display to have a fourth curvature corresponding to a second curvature of the second curved portion; a first light dispersion pattern layer (e.g., the first light dispersion pattern layer 481a of FIGS. 7A to 7C) including at least a portion disposed on at least a portion of the (1-2)th portion; and a second light dispersion pattern layer (e.g., the second light dispersion pattern layer 481b of FIGS. 7A to 7C) including at least a portion disposed on at least a portion of the (2-2)th portion.

According to various embodiments, the first light dispersion pattern layer and the second light dispersion pattern layer may be arranged to face each other when the first housing and the second housing are in an unfolded state (e.g., FIG. 6A or 7B), and be arranged to be oriented toward the hinge structure when the first housing and the second housing are in a folded state (e.g., FIG. 6C).

According to various embodiments, when the first housing and the second housing changes the state thereof from an unfolded state (e.g., FIG. 6A) to a folded state (e.g., FIG. 6C), the first display and the first glass member may be rotated in a first rotation direction (e.g., a counterclockwise direction of FIGS. 6A to 6C) with respect to a first shaft (e.g., the (2-1)th shaft 364a-1 of FIGS. 6A to 6C), the first shaft may be rotated in the first rotation direction with respect to a second shaft (e.g., the rotation shaft 363a-1 of FIGS. 6A to 6C) different from the first shaft, the second display and the second glass member may be rotated in a second rotation direction (e.g., a clockwise direction of FIGS. 6A to 6C) opposite to the first rotation direction with respect to a third shaft (e.g., the (2-2)th shaft 364b-1 of FIGS. 6A to 6C), and the third shaft may be rotated in the second rotation direction with respect to a fourth shaft (e.g., the rotation shaft 363b-1 of FIGS. 6A to 6C) different from the third shaft.

According to various embodiments, the first light dispersion pattern layer and the second light dispersion pattern layer may be configured to form a luminance reduction structure (e.g., the luminance reduction structure 481 of FIGS. 7A to 7C) at boundary surfaces between the first display and the second display when the first housing and the second housing are in an unfolded state (e.g., FIG. 7B).

According to various embodiments of the disclosure, a display structure may include: a first glass member including a first outer surface part (e.g., the first outer surface part 442 of FIGS. 7A to 7C) including a (1-1)th portion (e.g., the (1-1)th portion 442a of FIGS. 7A to 7C) and a (1-2)th portion (e.g., the (1-2)th portion 442b of FIGS. 7A to 7C) disposed to be substantially perpendicular to the (1-1)th portion and a first inner surface part (e.g., the first inner surface part 443 of FIGS. 7A to 7C) including a first curved portion (e.g., the first curved portion 443c of FIGS. 7A to 7C) formed in at least a portion of the first inner surface part; a second glass member including a second outer surface part (e.g., the second outer surface part 446 of FIGS. 7A to 7C) including a (2-1)th portion (e.g., the (2-1)th portion 446a of FIGS. 7A to 7C) and a (2-2)th portion (e.g., the (2-2)th portion of FIGS. 7A to 7C) disposed to be substantially perpendicular to the (2-1)th portion and a second inner surface part (e.g., the second inner surface part 447 of FIGS. 7A to 7C) including a second curved portion (e.g., the second curved portion 447c of FIGS. 7A to 7C) formed in at least a portion of the second inner surface part; a first display (e.g., the first display 451 of FIGS. 7A to 7C) disposed on the first glass member and including a third curved portion (e.g., the third curved portion 453 of FIGS. 7A to 7C) formed in at least a portion of the first display to have a third curvature corresponding to a first curvature of the first curved portion; a second display (e.g., the second display 455 of FIGS. 7A to 7C) disposed on the second glass member and including a fourth curved portion (e.g., the fourth curved portion 457 of FIGS. 7A to 7C) formed in at least a portion of the second display to have a fourth curvature corresponding to a second curvature of the second curved portion; and light dispersion pattern layers (e.g., the light dispersion pattern layers 480 of FIGS. 7A to 7C) including at least a portion disposed on at least one among at least a portion of the (1-2)th portion or at least a portion of the (2-2)th portion.

According to various embodiments, the light dispersion pattern layer may further comprises a first light dispersion pattern layer and a second light dispersion pattern layer, at least a portion of the first light dispersion pattern layer may be disposed on at least a portion of the (1-2)th portion, at least a portion of the second light dispersion pattern layer may be disposed on at least a portion of the (2-2)th portion, and the first light dispersion pattern layer and the second light dispersion pattern layer may form a luminance reduction structure at boundary surfaces between the first display and the second display, the boundary surfaces including the (1-2)th portion and the (2-2)th portion.

According to various embodiments, the luminance reduction structure may control a path of light to form a continuous image at a portion where the first display and the second display are connected to each other, and the luminance reduction structure may prevent light emitted from the third curved portion from reaching a portion of the second glass member and prevents light emitted from the fourth curved portion from reaching a portion of the first glass member.

According to various embodiments, at least one of the first light dispersion pattern layer or the second light dispersion pattern layer may comprise a coating layer for absorbing an impact occurring when the first light dispersion pattern layer and the second light dispersion pattern layer come into contact with each other.

According to various embodiments, a height of the first light dispersion pattern layer may be determined based on a maximum brightness of the first display, and a height of the second light dispersion pattern layer may be determined based on a maximum brightness of the second display.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing comprising a first housing and a second housing rotatable with respect to the first housing;
a hinge structure connecting the first housing to the second housing, the first housing and the second housing being configured to rotate between a folded state and an unfolded state via the hinge structure;
a first glass member disposed in the first housing and comprising a first outer surface part and a first inner surface part, the first outer surface part comprising a (1-1)th portion and a (1-2)th portion substantially perpendicular to the (1-1)th portion, the first inner surface part comprising a first curved portion;
a second glass member disposed in the second housing and comprising a second outer surface part and a second inner surface part, the second outer surface part comprising a (2-1)th portion and a (2-2)th portion substantially perpendicular to the (2-1)th portion, the second inner surface part comprising a second curved portion;
a first display disposed between the first housing and the first glass member and comprising a third curved portion having a third curvature corresponding to a first curvature of the first curved portion;
a second display disposed between the second housing and the second glass member and comprising a fourth curved portion having a fourth curvature corresponding to a second curvature of the second curved portion; and
a light dispersion pattern layer comprising at least a portion disposed on at least one among the (1-2)th portion of the first outer surface part or the (2-2)th portion of the second outer surface part.

2. The electronic device of claim 1, wherein the light dispersion pattern layer further comprises a first light dispersion pattern layer disposed on the (1-2)th portion and a second light dispersion pattern layer comprising at least a portion disposed on the (2-2)th portion.

3. The electronic device of claim 2,
wherein a height of the first light dispersion pattern layer is substantially identical to a height of the (1-2)th portion, and
wherein a height of the second light dispersion pattern layer is substantially identical to a height of the (2-2)th portion.

4. The electronic device of claim 2,
wherein a height of the first light dispersion pattern layer is smaller than a height of the (1-2)th portion, and
wherein a height of the second light dispersion pattern layer is smaller than a height of the (2-2)th portion.

5. The electronic device of claim 1,
wherein the first inner surface part further comprises a first connection portion connecting the first curved portion to the (1-2)th portion, and
wherein the second inner surface part further comprises a second connection portion connecting the second curved portion to the (2-2)th portion.

6. The electronic device of claim 5, wherein the light dispersion pattern layer further comprises:
a first light dispersion pattern layer comprising at least a portion disposed on the (1-2)th portion;
a second light dispersion pattern layer comprising at least a portion disposed on the (2-2)th portion;
a third light dispersion pattern layer comprising at least a portion disposed on the first connection portion; and
a fourth light dispersion pattern layer comprising at least a portion disposed on the second connection portion.

7. The electronic device of claim 6,
wherein the first light dispersion pattern layer is connected to the third light dispersion pattern layer, and
wherein the second light dispersion pattern layer is connected to the fourth light dispersion pattern layer.

8. The electronic device of claim 6,
wherein the first light dispersion pattern layer is spaced apart from the third light dispersion pattern layer, and
wherein the second light dispersion pattern layer is spaced apart from the fourth light dispersion pattern layer.

9. The electronic device of claim 1,
wherein the (1-1)th portion faces the (2-1)th portion when the first housing and the second housing are in the folded state,
wherein the (1-1)th portion is substantially parallel to the (2-1)th portion when the first housing and the second housing are in the unfolded state,
wherein the (1-2)th portion is substantially parallel to the (2-2)th portion when the first housing and the second housing are in the folded state, and
wherein the (1-2)th portion faces the (2-2)th portion when the first housing and the second housing are in the unfolded state.

10. The electronic device of claim 1, further comprising:
a hinge cover covering at least a portion of the hinge structure,
wherein at least a portion of at least one among the first outer surface part and the second outer surface part is oriented toward the hinge cover when the first housing and the second housing are in the folded state, and
wherein at least a portion of at least one among the first inner surface part and the second inner surface part is oriented toward the hinge cover when the first housing and the second housing are in the unfolded state.

11. The electronic device of claim 10,
wherein the light dispersion pattern layer further comprises:
a first light dispersion pattern layer disposed on the (1-2)th portion;
a second light dispersion pattern layer disposed on the (2-2)th portion;
a third light dispersion pattern layer comprising at least a portion disposed on the first inner surface part; and
a fourth light dispersion pattern layer comprising at least a portion disposed on the second inner surface part,
wherein the first light dispersion pattern layer and the second light dispersion pattern layer face each other when the first housing and the second housing are in the unfolded state,
wherein the first light dispersion pattern layer and the second light dispersion pattern layer are oriented toward the hinge cover when the first housing and the second housing are in the folded state,
wherein the third light dispersion pattern layer and the fourth light dispersion pattern layer are oriented toward the hinge cover when the first housing and the second housing are in the unfolded state, and
wherein the third light dispersion pattern layer and the fourth light dispersion pattern layer are parallel to each other when the first housing and the second housing are in the folded state.

12. The electronic device of claim 1, wherein the light dispersion pattern layer further comprises at least one among carbon, barium sulfate, titanium dioxide, polyester, epoxy, silane, and isophorone.

13. The electronic device of claim 1, wherein the light dispersion pattern layer is formed by at least one among an ink transfer process or an ink coating process.

14. The electronic device of claim 13,
wherein a thickness of the light dispersion pattern layer is in a range of 10 micrometers (um) to 30 um, and
wherein a height of the light dispersion pattern layer is in a range of 0.05 millimeters (mm) to 0.55 mm.

15. The electronic device of claim 1, wherein the (1-2)th portion and the (2-2)th portion are in close contact with each other when the first housing and the second housing are in the unfolded state.

16. An electronic device comprising:
a housing comprising a first housing and a second housing rotatable with respect to the first housing;
a hinge structure connecting the first housing to the second housing, the first housing and the second housing being configured to rotate between a folded state and an unfolded state via the hinge structure;
a first glass member disposed in the first housing and comprising a first outer surface part and a first inner surface part, the first outer surface part comprising a (1-1)th portion and a (1-2)th portion substantially perpendicular to the (1-1)th portion, the first inner surface part comprising a first curved portion;
a second glass member disposed in the second housing and comprising a second outer surface part and a second inner surface part, the second outer surface part comprising a (2-1)th portion and a (2-2)th portion substantially perpendicular to the (2-1)th portion, the second inner surface part comprising a second curved portion;
a first display disposed between the first housing and the first glass member and comprising a third curved portion having a third curvature corresponding to a first curvature of the first curved portion;
a second display disposed between the second housing and the second glass member and comprising a fourth curved portion having a fourth curvature corresponding to a second curvature of the second curved portion;
a first light dispersion pattern layer comprising at least a portion disposed on at least a portion of the (1-2)th portion; and
a second light dispersion pattern layer comprising at least a portion disposed on at least a portion of the (2-2)th portion.

17. The electronic device of claim 16,
wherein the first light dispersion pattern layer and the second light dispersion pattern layer face each other when the first housing and the second housing are in the unfolded state, and
wherein the first light dispersion pattern layer and the second light dispersion pattern layer are oriented toward the hinge structure when the first housing and the second housing are in the folded state.

18. The electronic device of claim 16, wherein, when the first housing and the second housing change from the unfolded state to the folded state:
the first display and the first glass member are rotated in a first rotation direction with respect to a first shaft;
the first shaft is rotated in the first rotation direction with respect to a second shaft different from the first shaft;
the second display and the second glass member are rotated in a second rotation direction opposite to the first rotation direction with respect to a third shaft; and
the third shaft is rotated in the second rotation direction with respect to a fourth shaft different from the third shaft.

19. The electronic device of claim 16, wherein the first light dispersion pattern layer and the second light dispersion pattern layer form a luminance reduction structure at boundary surfaces between the first display and the second display when the first housing and the second housing are in the unfolded state.

20. A display structure comprising:
a first glass member comprising a first outer surface part and a first inner surface part, the first outer surface part comprising a (1-1)th portion and a (1-2)th portion substantially perpendicular to the (1-1)th portion, the first inner surface part comprising a first curved portion;
a second glass member comprising a second outer surface part and a second inner surface part, the second outer surface part comprising a (2-1)th portion and a (2-2)th portion substantially perpendicular to the (2-1)th portion, the second inner surface part comprising a second curved portion;
a first display disposed on the first glass member and comprising a third curved portion having a third curvature corresponding to a first curvature of the first curved portion;
a second display disposed on the second glass member and comprising a fourth curved portion having a fourth curvature corresponding to a second curvature of the second curved portion; and
a light dispersion pattern layer comprising at least a portion disposed on at least one among at least a portion of the (1-2)th portion or at least a portion of the (2-2)th portion.

* * * * *